US012764707B2

(12) United States Patent
Jiang et al.

(10) Patent No.: US 12,764,707 B2
(45) Date of Patent: Oct. 13, 2026

(54) POSITIONING METHOD AND APPARATUS, AND COMMUNICATION DEVICE

(71) Applicant: VIVO MOBILE COMMUNICATION CO., LTD., Dongguan (CN)

(72) Inventors: Dajie Jiang, Dongguan (CN); Jianming Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 166 days.

(21) Appl. No.: 18/751,535

(22) Filed: Jun. 24, 2024

(65) Prior Publication Data

US 2024/0357542 A1 Oct. 24, 2024

Related U.S. Application Data

(63) Continuation of application No. PCT/CN2022/144296, filed on Dec. 30, 2022.

(30) Foreign Application Priority Data

Dec. 31, 2021 (CN) ........................ 202111676440.5

(51) Int. Cl.
*H04W 64/00* (2009.01)
*H04L 27/20* (2006.01)

(52) U.S. Cl.
CPC ............. *H04W 64/00* (2013.01); *H04L 27/20* (2013.01)

(58) Field of Classification Search
CPC ............................... H04W 64/00; H04L 27/20
See application file for complete search history.

(56) References Cited

U.S. PATENT DOCUMENTS

| | | | | |
|---|---|---|---|---|
| 11,290,960 | B2 * | 3/2022 | Ma | H04B 1/38 |
| 2019/0158341 | A1 * | 5/2019 | Talla | H04L 27/26 |
| 2020/0211372 | A1 | 7/2020 | Nabrotzky | |
| 2021/0250868 | A1 * | 8/2021 | Ma | H04B 1/38 |
| 2022/0077886 | A1 * | 3/2022 | Yan | H04K 1/02 |
| 2022/0390393 | A1 * | 12/2022 | Yan | G01N 23/203 |
| 2023/0003827 | A1 * | 1/2023 | Ko | G01S 5/0236 |
| 2024/0163840 | A1 * | 5/2024 | Säily | G01S 7/006 |
| 2024/0348408 | A1 * | 10/2024 | Jiang | H04L 5/0055 |
| 2024/0349229 | A1 * | 10/2024 | Jiang | G01S 7/006 |
| 2025/0070815 | A1 * | 2/2025 | Yan | G06K 7/10267 |

FOREIGN PATENT DOCUMENTS

| | | | |
|---|---|---|---|
| CN | 109073573 | A | 12/2018 |
| CN | 112073082 | A | 12/2020 |
| CN | 112954792 | A | 6/2021 |
| CN | 113495266 | A | 10/2021 |
| WO | 2021112649 | A1 | 6/2021 |
| WO | 2021155210 | A1 | 8/2021 |

* cited by examiner

*Primary Examiner* — Jaison Joseph
(74) *Attorney, Agent, or Firm* — The Webb Law Firm

(57) ABSTRACT

A positioning method includes receiving, by a backscatter end, a first signal sent by a first communication device; modulating, by the backscatter end, the first signal based on a second reference signal modulation sequence or a third reference signal modulation sequence to obtain a second signal; and sending, by the backscatter end, the second signal to a second communication device. The second reference signal modulation sequence is an orthogonal sequence determined based on binary phase shift keying BPSK modulation information. The third reference signal modulation sequence is determined based on the second reference signal modulation sequence.

20 Claims, 12 Drawing Sheets

200

POSITIONING METHOD AND APPARATUS, AND COMMUNICATION DEVICE

CROSS-REFERENCE TO RELATED APPLICATIONS

This application is a Bypass Continuation Application of International Patent Application No. PCT/CN2022/144296, filed Dec. 30, 2022, and claims priority to Chinese Patent Application No. 202111676440.5, filed Dec. 31, 2021, the disclosures of which are hereby incorporated by reference in their entireties.

BACKGROUND OF THE INVENTION

Field of the Invention

This application pertains to the field of communications technologies, and relates to a positioning method and apparatus, and a communication device.

Description of Related Art

A sensing/positioning technology based on backscatter characteristics is introduced in a related communications technology. In the sensing/positioning technology based on backscatter characteristics, a backscatter end provides identification (ID) related information of a backscatter device, so that a receive end performs sensing/positioning on a reflecting object based on the ID related information.

However, when the receive end receives a signal, the receive end is affected by an interference signal in a positioning process. As a result, the sensing/positioning technology based on backscatter characteristics used in the related technology still has a problem of poor positioning accuracy.

SUMMARY OF THE INVENTION

Embodiments of this application provide a positioning method and apparatus, and a communication device.

According to a first aspect, a positioning method is provided and includes: receiving, by a backscatter end, a first signal sent by a first communication device; modulating, by the backscatter end, the first signal based on a second reference signal modulation sequence or a third reference signal modulation sequence to obtain a second signal; and sending, by the backscatter end, the second signal to a second communication device, where the second reference signal modulation sequence is an orthogonal sequence determined based on binary phase shift keying BPSK modulation information, and the third reference signal modulation sequence is determined based on the second reference signal modulation sequence.

According to a second aspect, a positioning method is provided. The method includes: receiving, by a second communication device, a target signal, where the target signal includes at least a first signal sent by a first communication device and/or a second signal sent by at least one backscatter end; and positioning, by the second communication device, at least one of the first communication device, the second communication device, or a target backscatter end based on the first signal and/or at least one second signal, where the target backscatter end is any one of the at least one backscatter end, the second signal is obtained by modulating the first signal based on a second reference signal modulation sequence or a third reference signal modulation sequence, the second reference signal modulation sequence is an orthogonal sequence determined based on binary phase shift keying BPSK modulation information, and the third reference signal modulation sequence is determined based on the second reference signal modulation sequence.

According to a third aspect, a positioning method is provided. The method includes either of the following: sending, by a network-side device, a second reference signal modulation sequence and/or a third reference signal modulation sequence to each backscatter end based on identification information of at least one backscatter end; and sending, by the network-side device, a first modulation matrix and/or a second modulation matrix to the at least one backscatter end, where the second reference signal modulation sequence is any one of a plurality of row vectors included in the first modulation matrix, and the second reference signal modulation sequence is an orthogonal sequence determined based on binary phase shift keying BPSK modulation information; and the third reference signal modulation sequence is any one of a plurality of row vectors included in the second modulation matrix, and the third reference signal modulation sequence is determined based on the second reference signal modulation sequence.

According to a fourth aspect, a positioning apparatus is provided and includes: a first receiving module, configured to receive a first signal sent by a first communication device; a modulation module, configured to modulate the first signal based on a second reference signal modulation sequence or a third reference signal modulation sequence to obtain a second signal; and a first sending module, configured to send the second signal to a second communication device, where the second reference signal modulation sequence is an orthogonal sequence determined based on binary phase shift keying BPSK modulation information, and the third reference signal modulation sequence is determined based on the second reference signal modulation sequence.

According to a fifth aspect, a positioning apparatus is provided and includes: a second receiving module, configured to receive a target signal, where the target signal includes at least a first signal sent by a first communication device and/or a second signal sent by at least one backscatter end; and a positioning module, configured to position at least one of the first communication device, the second communication device, or a target backscatter end based on the first signal and/or at least one second signal, where the target backscatter end is any one of the at least one backscatter end, the second signal is obtained by modulating the first signal based on a second reference signal modulation sequence or a third reference signal modulation sequence, the second reference signal modulation sequence is an orthogonal sequence determined based on binary phase shift keying BPSK modulation information, and the third reference signal modulation sequence is determined based on the second reference signal modulation sequence.

According to a sixth aspect, a positioning apparatus is provided and includes: a second sending module, configured to send a second reference signal modulation sequence and/or a third reference signal modulation sequence to each backscatter end based on identification information of at least one backscatter end; or configured to send a first modulation matrix and/or a second modulation matrix to the at least one backscatter end, where the second reference signal modulation sequence is any one of a plurality of row vectors included in the first modulation matrix, and the second reference signal modulation sequence is an orthogonal sequence determined based on binary phase shift keying BPSK modulation information; and the third reference signal modulation sequence is any one of a plurality of row vectors included in the second modulation matrix, and the third reference signal modulation sequence is determined based on the second reference signal modulation sequence.

According to a seventh aspect, a communication device is provided. The communication device includes a processor and a memory. The memory stores a program or instructions capable of running on the processor. When the program or instructions are executed by the processor, the steps of the method according to the first aspect, the second aspect, or the third aspect are implemented.

According to an eighth aspect, a communication device is provided and includes a processor and a communication interface. The communication interface is coupled to the processor. The processor is configured to run a program or instructions to implement the steps of the method according to the first aspect, or implement the steps of the method according to the second aspect, or implement the steps of the method according to the third aspect.

According to a ninth aspect, a positioning system is provided and includes a first communication device and a second communication device. The first communication device may be configured to perform the steps of the method according to the first aspect. The second communication device may be configured to perform the steps of the method according to the second aspect.

According to a tenth aspect, a non-transitory readable storage medium is provided. The non-transitory readable storage medium stores a program or instructions. When the program or instructions are executed by a processor, the steps of the method according to the first aspect are implemented, or the steps of the method according to the second aspect are implemented, or the steps of the method according to the third aspect are implemented.

According to an eleventh aspect, a chip is provided. The chip includes a processor and a communication interface. The communication interface is coupled to the processor. The processor is configured to run a program or instructions to implement the steps of the method according to the first aspect, or implement the steps of the method according to the second aspect, or implement the steps of the method according to the third aspect.

According to a twelfth aspect, a computer program or program product is provided. The computer program or program product is stored in a non-transitory storage medium. The computer program or program product is executed by at least one processor to implement the steps of the method according to the first aspect, or implement the steps of the method according to the second aspect, or implement the steps of the method according to the third aspect.

DESCRIPTION OF THE INVENTION

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

It should be noted that technologies described in the embodiments of this application are not limited to a long term evolution (LTE)/LTE-Advanced (LTE-A) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. However, in the following descriptions, the new radio (NR) system is described for an illustrative purpose, and NR terms are used in most of the following descriptions. These technologies may also be applied to other applications than an NR system application, for example, a $6^{th}$ Generation (6G) communications system.

Figure 1A:
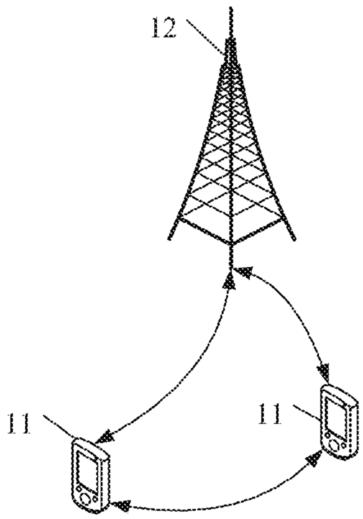
FIG. 1A is a schematic structural diagram of a wireless communications system according to an embodiment of this application.

FIG. 1*a* is a block diagram of a wireless communications system to which an embodiment of this application may be applied. The wireless communications system includes a terminal 11 and a network-side device 12. The terminal 11 may be a terminal-side device such as a mobile phone, a tablet personal computer (Tablet Personal Computer), a laptop computer (Laptop Computer) or a notebook computer, a personal digital assistant (Personal Digital Assistant, PDA), a palmtop computer, a netbook, an ultra-mobile personal computer (ultra-mobile personal computer, UMPC), a mobile Internet device (Mobile Internet Device, MID), an augmented reality (augmented reality, AR) or virtual reality (virtual reality, VR) device, a robot, a wearable device (Wearable Device), vehicle user equipment (VUE), pedestrian user equipment (PUE), a smart home (a home device having a wireless communication function, such as a refrigerator, a television, a washing machine, or furniture), a game console, a personal computer (personal computer, PC), a teller machine, or a self-service machine. The wearable device includes a smartwatch, a smart band, a smart headphone, smart glasses, smart jewelry (a smart bracelet, a smart wrist chain, a smart ring, a smart necklace, a smart anklet, a smart ankle chain, or the like), a smart wristband, smart clothing, or the like. It should be noted that a specific type of the terminal 11 is not limited in the embodiments of this application. The network-side device 12 may include an access network device or a core network device. The access network device may also be referred to as a radio access network device, a radio access network (Radio Access Network, RAN), a radio access network function, or a radio access network element. The access network device may include a base station, a WLAN access point, a Wi-Fi node, or the like. The base station may be referred to as a NodeB, an evolved NodeB (eNB), an access point, a base transceiver station (Base Transceiver Station, BTS), a radio base station, a radio transceiver, a basic service set (Basic Service Set, BSS), an extended service set (Extended Service Set, ESS), a home NodeB, a home evolved NodeB, a transmission and reception point (TRP), or another appropriate term in the art. As long as the same technical effect is achieved, the base station is not limited to specific technical terms. It should be noted that in the embodiments of this application, only a base station in an NR system is used as an example for description, but a specific type of the base station is not limited.

Figure 1B:
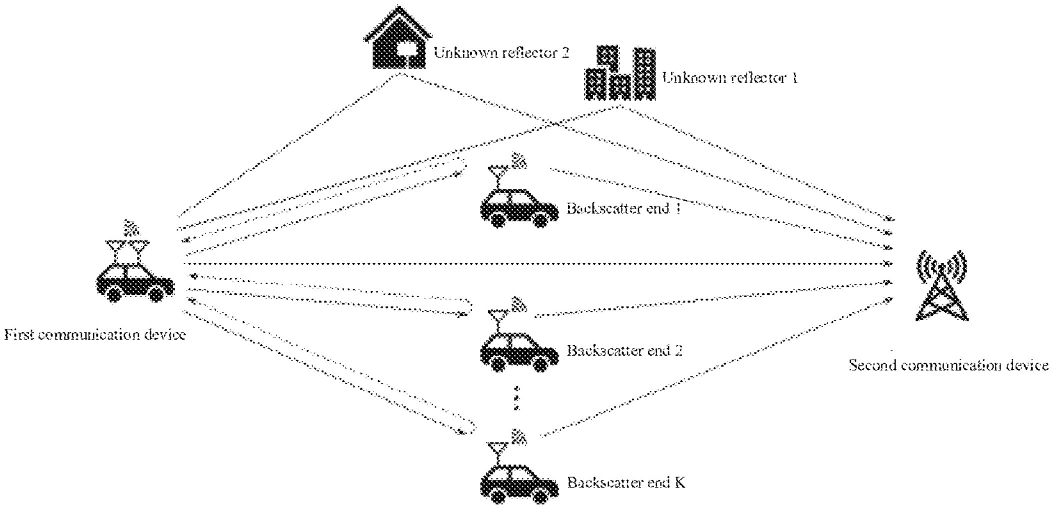
FIG. 1B is a first schematic structural diagram of a positioning system according to an embodiment of this application.

Based on the foregoing description of the wireless communications system, as shown in FIG. 1B, an embodiment of this application further provides a positioning system. The positioning system includes a first communication device, a second communication device, K backscatter ends, and two unknown reflectors (Object). It should be noted that the positioning system includes but is not limited to the objects shown in FIG. 1B. For example, the positioning system may include more or fewer objects than those shown in FIG. 1B. For example, the positioning system may include a plurality of second communication devices and a plurality of unknown reflectors. This is not limited herein.

The first communication device is used as a signal transmit end. The second communication device is used as a signal receive end and a positioning/measurement end. It should be noted that device types of the first communication device and the second communication device vary depending on different positioning scenarios.

For example, assuming that a positioning scenario is a UU uplink positioning scenario shown in FIG. 1B, the first communication device may be a terminal, such as a vehicle shown in FIG. 1B, and the second communication device is a network-side device, such as a gNb shown in FIG. 1B.

Figure 1C:
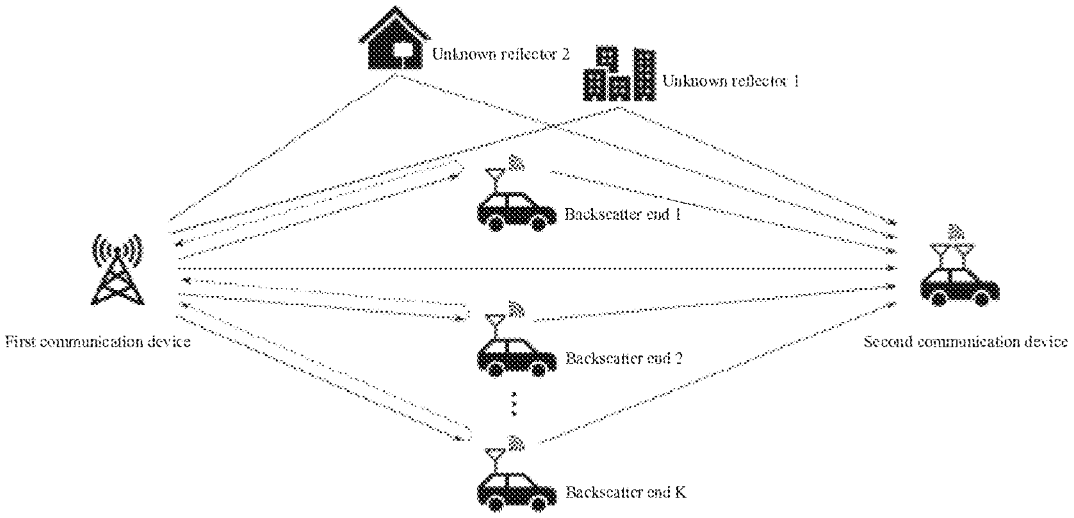
FIG. 1C is a second schematic structural diagram of a positioning system according to an embodiment of this application.

For another example, assuming that a positioning scenario is a UU downlink positioning scenario, the first communication device may be a network-side device, such as a gNb shown in FIG. 1C, and the second communication device is a terminal, such as a vehicle shown in FIG. 1C.

Figure 1D:
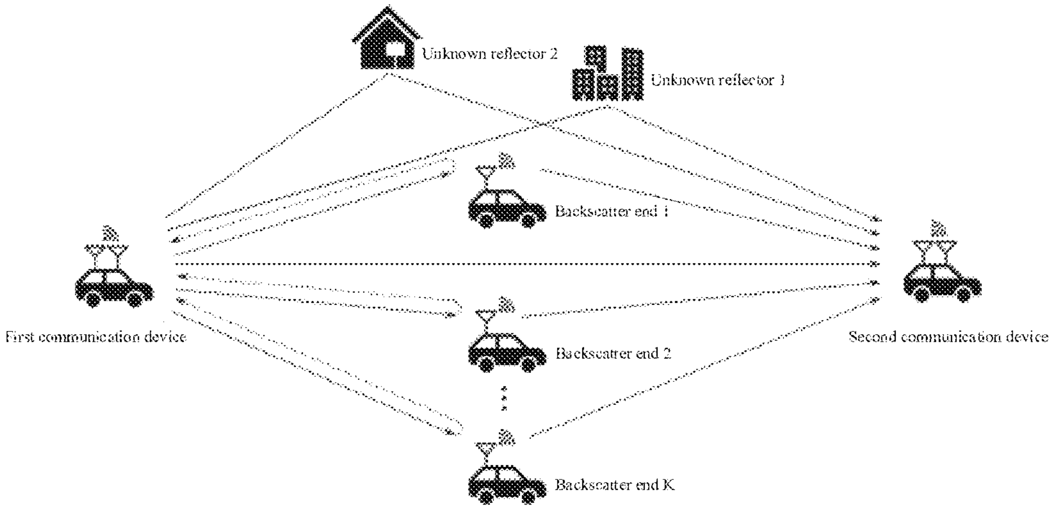
FIG. 1D is a third schematic structural diagram of a positioning system according to an embodiment of this application.

For another example, assuming that a positioning scenario is a sidelink (SL) positioning scenario, both the first communication device and the second communication device may be terminals, such as vehicles shown in FIG. 1D and vehicles shown in FIG. 1B. In addition, it should be noted that, with reference to FIG. 1D again, if the positioning scenario is the SL positioning scenario, the positioning system may further include a network-side device to serve the first communication device, the second communication device, and the K backscatter ends, for example, to provide a second reference signal modulation sequence for the backscatter end.

The backscatter end is configured to modulate a signal from the first communication device and then send (for example, reflect) the signal. Correspondingly, the second communication device may position itself or the first communication device or the backscatter end based on the received signal sent by the backscatter end and/or the signal sent by the first communication device. In this embodiment, a device type of the backscatter end may vary depending on different application scenarios. For example, in a V2X application scenario, the backscatter end may be vehicle-to-everything (V2X) UE or a tag disposed on the V2X UE. This is not limited herein.

The unknown reflectors may be any objects existing in the positioning scenario and capable of implementing signal reflection, such as buildings, vehicles, or intelligent devices. This is not limited herein.

It may be understood that in the positioning system, in addition to impact of the unknown reflectors on positioning accuracy, for different positioning objects, signals on other devices than the positioning objects also cause interference to positioning of the positioning objects. For example, assuming that the positioning object is the first communication device or the second communication device, the signal on the backscatter end also causes interference to positioning of the first communication device or the second communication device. For another example, assuming that the positioning object is a target backscatter end, signals on the first communication device and other backscatter ends than the target backscatter end cause interference to positioning of the target backscatter end.

Certainly, in the foregoing different positioning scenarios, the second communication device serves as a terminal that performs positioning operations. For example, in the UU uplink positioning scenario and the SL positioning scenario, the second communication device may perform positioning operations on the first communication device and/or the backscatter end; and in the UU positioning scenario, the second communication device may position itself (that is, the second communication device) and/or the backscatter end.

It should be noted that regardless of specific positioning scenarios, for the type of the terminal, reference may be made to the related description of the terminal 11, and for the network-side device, reference may be made to the related description of the network-side device 12.

In addition, a positioning solution provided in this application may be applied, without limitation, to a monostatic backscatter communications system (MBCS), a bistatic backscatter communications system (BBCS), and an ambient backscatter communications system (ABCS). For clarity of description, a bistatic backscatter positioning scenario is used as an example in the following embodiments, and the technical solutions provided in the embodiments of this application are described by assuming that each backscatter end is completely synchronized with the first communication device and the second communication device.

On this basis, the technical solutions provided in the embodiments of this application are hereinafter described in detail by using some embodiments and application scenarios thereof with reference to the accompanying drawings.

Figure 2:
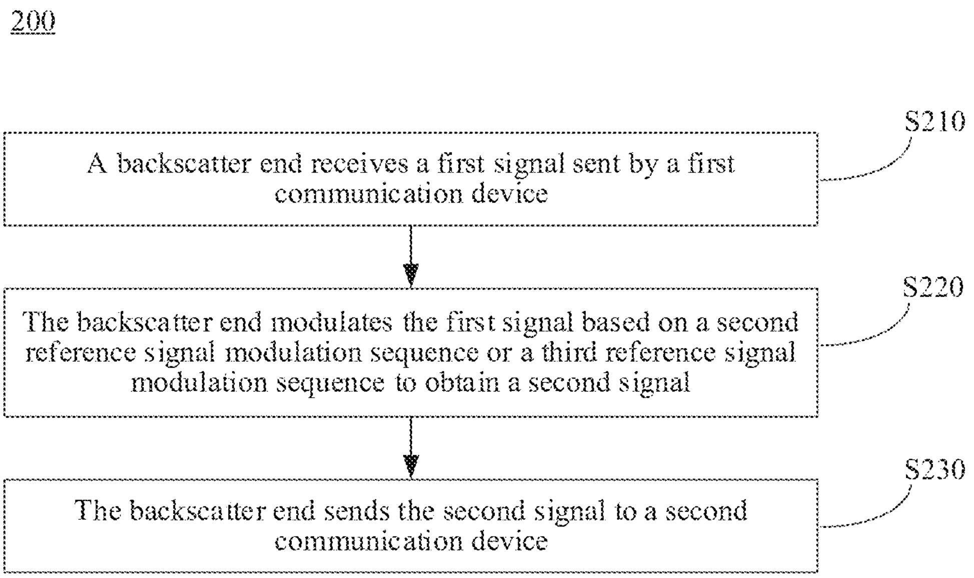
FIG. 2 is a first schematic flowchart of a positioning method according to an embodiment of this application.

FIG. 2 is a schematic flowchart of a positioning method 200 according to an exemplary embodiment of this application. The method 200 may be performed by a first communication device, but this is not limited. The method may be performed by hardware and/or software installed in the first communication device. In this embodiment, the method 200 may include at least the following steps.

S210. A backscatter end receives a first signal sent by a first communication device.

Before a positioning process is started, a second communication device performing positioning may select a communication device near the backscatter end as the first communication device to reduce a distance between the backscatter end and the first communication device, thereby reducing a round-trip path loss and ensuring that the second communication device receives a reflected signal with a higher signal-to-noise ratio (SNR).

The first signal may be obtained by the first communication device based on a first reference signal modulation sequence. Optionally, the first reference signal modulation sequence may be a positioning reference signal (PRS) modulation sequence, a sounding reference signal (SRS), a channel state information reference signal (CSI-RS) modulation sequence, a demodulation reference signal (DMRS) sequence, or the like. Correspondingly, the first signal may be a PRS, an SRS, a CSI-RS, a DMRS, or the like.

In this embodiment, the first reference signal modulation sequence may include N symbols s(n). The symbol s(n) may be an orthogonal frequency division multiplexing (OFDM) symbol, a code division multiple access (CDMA) symbol, or the like. N is an integer greater than or equal to 1, and $1 \le n \le N$. Based on this, in an implementation, a symbol in the first reference signal modulation sequence may reuse a positioning reference signal (PRS) in a Third Generation Partnership Project (3GPP) standard, that is, each symbol in the first reference signal modulation sequence may be determined based on an OFDM symbol or an OFDM slot.

In addition, depending on different positioning requirements, the first reference signal modulation sequence may be preconfigured in the first communication device, or may be obtained by the first communication device from a network-side device (such as a serving base station of the first communication device). This is not limited herein.

S220. The backscatter end modulates the first signal based on a second reference signal modulation sequence or a third reference signal modulation sequence to obtain a second signal.

S230. The backscatter end sends the second signal to the second communication device.

The third reference signal modulation sequence is determined based on the second reference signal modulation sequence.

For S220 and S230, in this application, a signal phase or an on-off reflection status of the backscatter end in different time units (such as slots) is controlled by modulating different pilot reference signal blocks (such as the second reference signal modulation sequence or the third reference signal modulation sequence).

For example, the second reference signal modulation sequence is an orthogonal sequence determined based on binary phase shift keying (BPSK) modulation information (that is, the second reference signal modulation sequence is a BPSK modulation sequence). In this case, after the backscatter end receives the first signal, the signal phase of the backscatter end in different time units may be controlled based on a modulation symbol (such as 1 or −1) in the BPSK modulation sequence. In this way, the phase in different time units is controlled.

For another example, the third reference signal modulation sequence is an orthogonal sequence determined based on the second reference signal modulation sequence. In this embodiment, in addition to controlling the signal phase in different time units by using a modulation symbol (such as 1 or −1) in the third reference signal modulation sequence at the backscatter end, control of an on or off state of the backscatter end is added. For example, the backscatter end within on-duration (corresponding to the modulation symbol "1" or "−1" in the third reference signal modulation sequence) reflects the second signal, while the backscatter end within off-duration (corresponding to the modulation symbol "0" in the third reference signal modulation sequence) is in a silent state for collecting battery energy, that is, does not perform signal reflection.

Based on this, the second communication device may use orthogonal characteristics of the second reference signal modulation sequence or the third reference signal modulation sequence to process a received target signal (for example, perform addition and subtraction operations), to cancel an interference signal that affects sensing/positioning calculation, thereby implementing positioning of the first communication device, the second communication device, or a target backscatter end, where the target backscatter end is any one of at least one backscatter end participating in the positioning process. It may be understood that the second communication device knows what the second reference signal modulation sequence or the third reference signal modulation sequence used by each backscatter end is.

For example, with reference to FIG. 1B again, the target signal received by the second communication device may include one or more of the first signal (also referred to as a diameter signal) from the first communication device, the second signal (also referred to as a reflected signal) from the backscatter end, an interference signal from an unknown reflector, and an additive white Gaussian noise (AWGN) signal. In this case, the second communication device may cancel, based on the orthogonal characteristics of the second reference signal modulation sequence or the orthogonal characteristics of the third reference signal modulation sequence, interference caused by the diameter signal and/or the second signal sent by the target backscatter end to positioning of the target backscatter end, to implement positioning of the target backscatter end; or cancel interference caused by the second signal sent by the backscatter end to the diameter signal, to implement positioning of the target backscatter end, or the like.

It should be noted that, similar to the first reference signal modulation sequence, the second reference signal modulation sequence or the third reference signal modulation sequence may also be a PRS modulation sequence, a CSI-RS modulation sequence, an SRS modulation sequence, a DMRS modulation sequence, or the like. Correspondingly, the second signal may also be a PRS, a CSI-RS, an SRS, a DMRS, or the like. This is not limited herein.

Moreover, in an implementation, in addition to the orthogonal sequence determined based on the BPSK modulation information, the second reference signal modulation sequence may be an orthogonal sequence determined based on other signals such as a frequency shift keying (FSK) signal. This is not limited herein.

In this embodiment, based on orthogonal characteristics of the second reference signal modulation sequence or the third reference signal modulation sequence, a signal phase or reflection status of the backscatter end in different time units (such as slots) is controlled, so that the second communication device can perform an operation on the received target signal based on characteristics of the second reference signal modulation sequence or the third reference signal modulation sequence, to cancel an interference signal that affects the positioning process, thereby implementing positioning of the first communication device, the second communication device, or the target backscatter end, and improving positioning accuracy.

Figure 3:
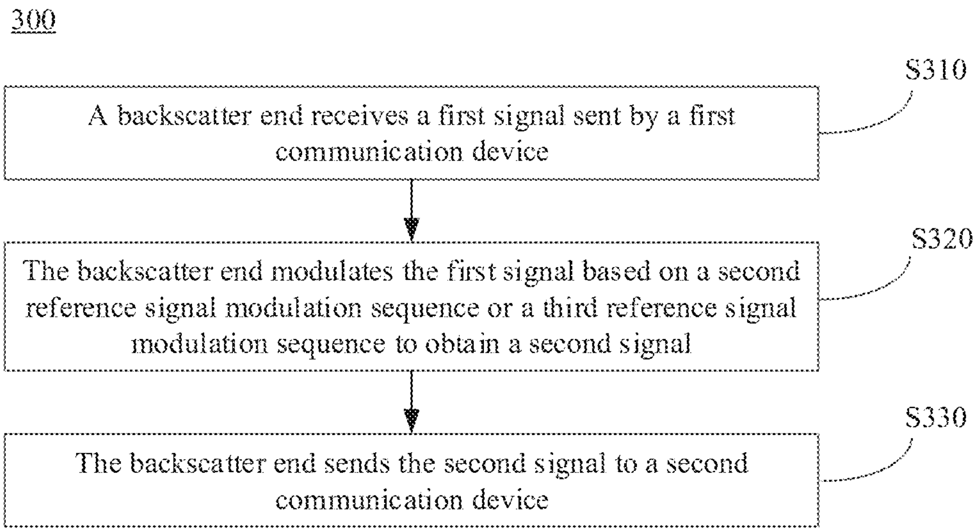
FIG. 3 is a second schematic flowchart of a positioning method according to an embodiment of this application.

FIG. 3 is a schematic flowchart of a positioning method 300 according to an exemplary embodiment of this application. The method 300 may be performed by a first communication device, but this is not limited. The method may be performed by hardware and/or software installed in the first communication device. In this embodiment, the method 300 may include at least the following steps.

S310. A backscatter end receives a first signal sent by a first communication device.

It may be understood that, for an implementation process of S310, reference may be made to the related description in the method embodiment 200. To avoid repetition, details are not described herein again.

S320. The backscatter end modulates the first signal based on a second reference signal modulation sequence or a third reference signal modulation sequence to obtain a second signal.

It may be understood that for an implementation process of S320, reference may be made to the related description in the method embodiment 200. In a possible implementation, the second reference signal modulation sequence may include M+x (x is 1 or 2) modulation symbols, where M is related to a quantity of backscatter ends participating in a positioning process. For example, M is equal to the quantity of the backscatter ends participating in the positioning process, that is, M is an integer greater than or equal to 1.

Figure 4A:
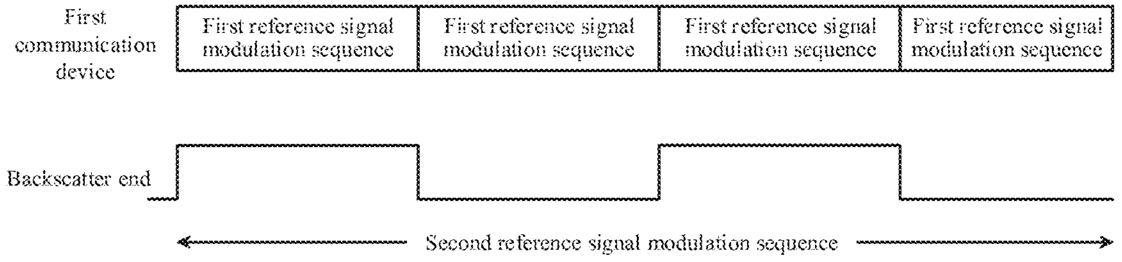
FIG. 4A is a schematic diagram of a relationship between modulation duration of a first reference signal modulation sequence and modulation duration of a second reference signal modulation sequence according to an embodiment of this application.

Based on this, in an implementation, modulation duration corresponding to a first reference signal modulation sequence and modulation duration corresponding to the second reference signal modulation sequence are in an M+x times relationship, as shown in FIG. 4A.

In addition, it may be understood that if the first reference signal modulation sequence includes N symbols, a sequence length of a reflected signal (that is, the second signal) obtained through modulation based on the first reference signal modulation sequence and the second reference signal modulation sequence may be N×(M+x). For ease of description, the modulation duration of the second reference signal modulation sequence in this embodiment may be equal to a length of one time unit, that is, phase control of the backscatter end is performed per time unit. The time unit and time units mentioned subsequently may be all slots, symbols, frames, subframes, or the like. This is not limited herein.

Optionally, in this embodiment, the second reference signal modulation sequence and the third reference signal modulation sequence may be preconfigured in the backscatter end, or may be obtained by the backscatter end from a network-side device. For example, the process in which the backscatter end obtains the second reference signal modulation sequence from the network-side device is described herein with reference to the following manners 1 to 5.

Manner 1: The backscatter end obtains the second reference signal modulation sequence from the network-side device, where the second reference signal modulation sequence is selected by the network-side device, based on identification information of the backscatter end, from a plurality of row vectors included in a first modulation matrix.

The second reference signal modulation sequence selected by the network-side device for each backscatter end may be partially the same or different. In other words, for different backscatter ends, used second reference signal modulation sequences may be the same or different. It should be noted that in the manner 1, because the network-side device needs to indicate the second reference signal modulation sequence to each backscatter end based on the identification information (ID) of the backscatter end, each backscatter end needs to indicate its ID to the network-side device before the positioning or sensing operation.

Manner 2: The backscatter end obtains the first modulation matrix from the network-side device, and selects, based on the identification information of the backscatter end, the second reference signal modulation sequence from the plurality of row vectors included in the first modulation matrix.

Similarly to the manner 1, in the manner 2, when each backscatter end selects the second reference signal modulation sequence based on its own identification information, second reference signal modulation sequences selected by different backscatter ends may be the same or different. In other words, for different backscatter ends, used second reference signal modulation sequences may be the same or different.

Manner 3: The backscatter end obtains the third reference signal modulation sequence from the network-side device, where the third reference signal modulation sequence is selected by the network-side device, based on the identification information of the backscatter end, from a plurality of row vectors included in a second modulation matrix.

Manner 4: The backscatter end obtains the second modulation matrix from the network-side device, and selects, based on the identification information of the backscatter end, the third reference signal modulation sequence from the plurality of row vectors included in the second modulation matrix.

Manner 5: The backscatter end obtains the second reference signal modulation sequence from the network-side device, and determines the third reference signal modulation sequence based on the second reference signal modulation sequence.

It may be understood that for the implementation processes of the foregoing manners 3 to 5, reference may be made to the foregoing description of the second reference signal modulation sequence. However, it should be noted that regardless of the second reference signal modulation sequence or the third reference signal modulation sequence, if it is selected or determined by the backscatter end from a modulation matrix, the backscatter end needs to report the selected or determined second reference signal modulation sequence and/or third reference signal modulation sequence to the network-side device, to ensure synchronization of information between the backscatter end and the network-side device, thereby ensuring smooth progress of the positioning process.

In addition, in the foregoing manners 1 and 5, if the positioning scenario is a UU uplink positioning scenario, the network-side device may be a second communication device; if the positioning scenario is a UU downlink positioning scenario, the network-side device may be the first communication device; or if the positioning scenario is an SL positioning scenario, the network-side device is a network-side device that provides a service for the first communication device and/or the second communication device and/or the backscatter end. This is not limited herein.

Certainly, for the second reference signal modulation sequence and the third reference signal modulation sequence, their sequence lengths are related to the backscatter end participating in positioning. The following separately describes implementations of the second reference signal modulation sequence and the third reference signal modulation sequence sequentially.

In an implementation, assuming that there are M backscatter ends in the positioning scenario, to cancel interference between the backscatter ends, characteristics of the second reference signal modulation sequence may be: a first element in the second reference signal modulation sequence is −1, and second elements other than the first element are all 1, that is, in the positioning scenario, a phase of a reflected signal (that is, the second signal) of one backscatter end in a specified time unit may be controlled to be negative, and phases of reflected signals (that is, the second signal) in other time units than the specified time unit may be controlled to be positive, to achieve control of the signal phase.

Considering that the second reference signal modulation sequence is selected from the first modulation matrix, for the plurality of row vectors in the first modulation matrix, the first element in each row vector is −1, the second elements other than the first element are all 1, and a position of the first element in each row vector is different. For example, the first modulation matrix B is shown in an equation (1):

$$B=\begin{bmatrix}B_1\\B_2\\\vdots\\B_M\end{bmatrix}=\begin{bmatrix}b_{1,1}&b_{1,2}&\dots&b_{1,M+1}\\b_{2,1}&b_{2,2}&\dots&b_{2,M+1}\\\vdots&\vdots&\ddots&\vdots\\b_{M,1}&b_{M,2}&\dots&b_{M,M+1}\end{bmatrix}=\begin{bmatrix}1&-1&1&\dots&1\\1&1&-1&\dots&1\\\vdots&\vdots&\vdots&\ddots&\vdots\\1&1&1&\dots&-1\end{bmatrix}\tag{1}$$

where M is an integer greater than or equal to 1, and a length of the second reference signal modulation sequence is M+1. Moreover, it should be noted that in addition to setting elements in a first column in the first modulation matrix shown in the equation (1) to 1, it is also possible to set elements in another column in the first modulation matrix (that is, a first column vector) to 1, that is, in addition to being located in the first column shown in the equation (1), the first column vector may also be located in any other column in the first modulation matrix. Alternatively, for the second reference signal modulation sequence, that elements "1" in each second reference signal modulation sequence are at the same position suffices.

Figure 4B:
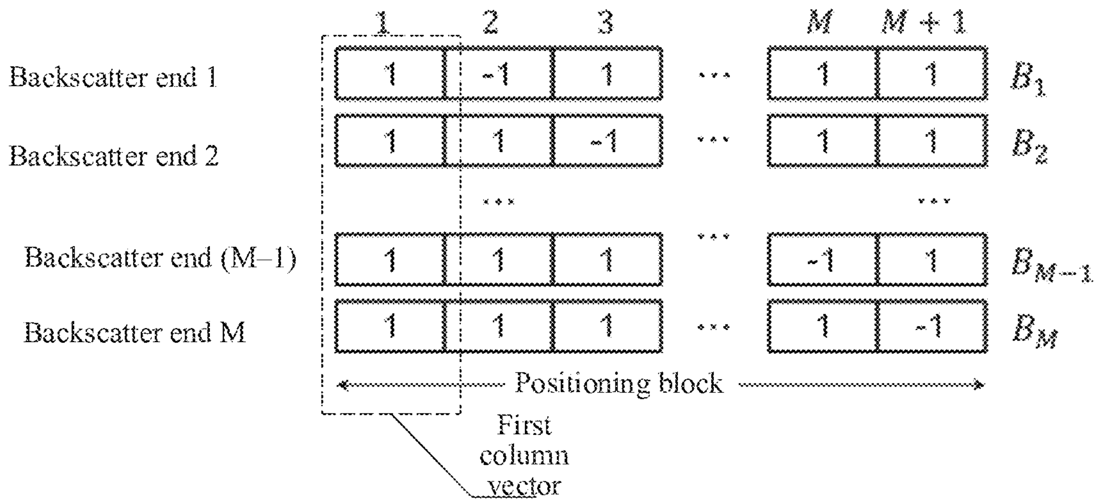
FIG. 4B is a first schematic diagram of a modulation process in which M backscatter ends perform signal modulation based on a second reference signal modulation sequence according to an embodiment of this application.

Optionally, for the first modulation matrix or the second reference signal modulation sequence, if the sequence length is greater than 3 (for example, M is greater than 2), M backscatter ends may simultaneously modulate reflected pilot signals (such as the second signal) by using the second reference signal modulation sequence. Therefore, the reflected signal at the backscatter end affects positioning performance of the first communication device. In other words, if the second reference signal modulation sequence shown in FIG. 4B (that is, the first modulation matrix in the equation (1)) is used, the second communication device can position the backscatter end, but cannot implement positioning of the first communication device or the second communication device itself.

Based on this, this application considers adding an element "−1" to each second reference signal modulation sequence, that is, adjusting the sequence length of the second reference signal modulation sequence to M+2. The characteristics of the second reference signal modulation sequence are: there are two elements "−1" in the second reference signal modulation sequence, and other elements than the two elements "−1" are all "1". In other words, in a case that the length of the second reference signal modulation sequence is greater than 3, the first modulation matrix further includes a second column vector, and each element in the second column vector is −1.

Figure 4C:
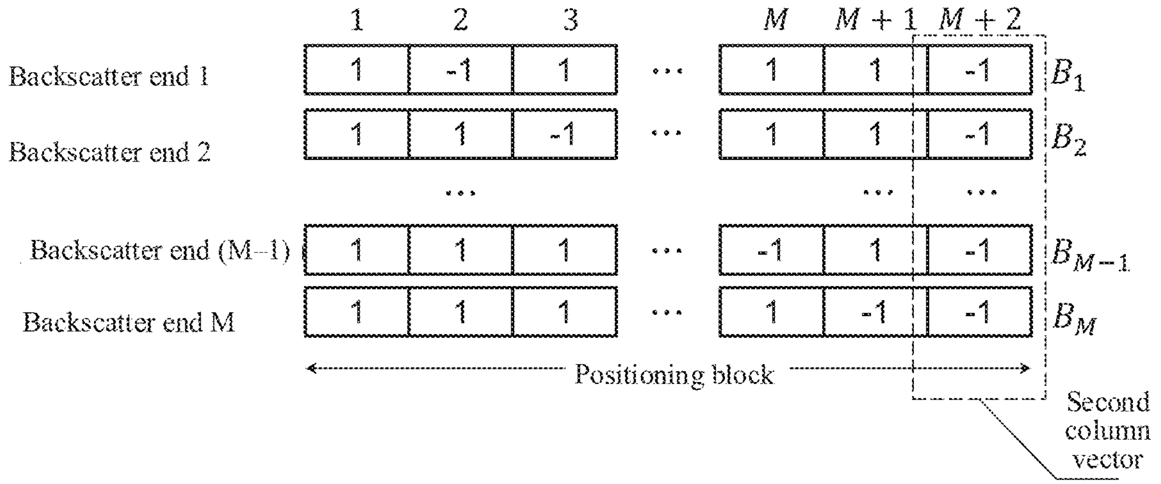
FIG. 4C is a second schematic diagram of a modulation process in which M backscatter ends perform signal modulation based on a second reference signal modulation sequence according to an embodiment of this application.

In an implementation, with reference to FIG. 4C and an equation (2), the second reference signal modulation sequence corresponding to each backscatter end is shown in FIG. 4C, and the first modulation matrix is shown in the equation (2).

$$B=\begin{bmatrix}B_1\\B_2\\\vdots\\B_M\end{bmatrix}=\begin{bmatrix}b_{1,1}&b_{1,2}&\dots&b_{1,M+1}\\b_{2,1}&b_{2,2}&\dots&b_{2,M+1}\\\vdots&\vdots&\ddots&\vdots\\b_{M,1}&b_{M,2}&\dots&b_{M,M+1}\end{bmatrix}=\begin{bmatrix}1&-1&1&\dots&1&-1\\1&1&-1&\dots&1&-1\\1&\vdots&\vdots&-1&\vdots&\vdots\\1&1&1&\dots&-1&-1\end{bmatrix}\tag{2}$$

In the equation (2), it should be noted that the second column vector may be located at any position in the first modulation matrix in addition to being located in the last column of the first modulation matrix. This is not limited herein.

On a basis of the second reference signal modulation sequence given above, in this application, the third reference signal modulation sequence determined based on the second reference signal modulation sequence is used, mainly to resolve a problem of mutual interference between backscatter ends. For example, if there is no coordination between the backscatter ends, for example, if more than two backscatter ends use the same second reference signal modulation sequence, or if a quantity of backscatter ends required to be positioned is greater than M, there is a phenomenon of mutual interference between the backscatter ends. "A quantity of backscatter ends to be positioned is greater than M" may be understood as "the second reference signal modulation sequence is designed based on a maximum value M of the quantity of backscatter ends". If the network-side device configures a second reference signal modulation sequence whose sequence length is M for the M backscatter ends, there is no mutual interference between the backscatter ends. However, in a practical application, the network-side device has to support a scenario in which a total quantity of backscatter ends is greater than M. Therefore, there is mutual interference between the backscatter ends.

In this regard, in an implementation, the process of determining the third reference signal modulation sequence based on the second reference signal modulation sequence may include: multiplying the second reference signal modulation sequence by an on-off vector sequence to obtain the third reference signal modulation sequence, where elements in the on-off vector sequence include at least one third element and at least one fourth element, the third element is 0, and the fourth element is 1. For example, the on-off vector sequence A is: A=[0 1 . . . 0 1].

Based on this, assuming that a quantity of elements in the on-off vector sequence is L, and that the modulation duration corresponding to the second reference signal modulation sequence and modulation duration corresponding to the on-off vector sequence are in an L times relationship, a sequence length of the third reference signal modulation sequence obtained by multiplying the second reference signal modulation sequence by the on-off vector sequence is L×(M+x), and each element in the third reference signal modulation sequence may be 1, 0, or −1.

Figure 4D:
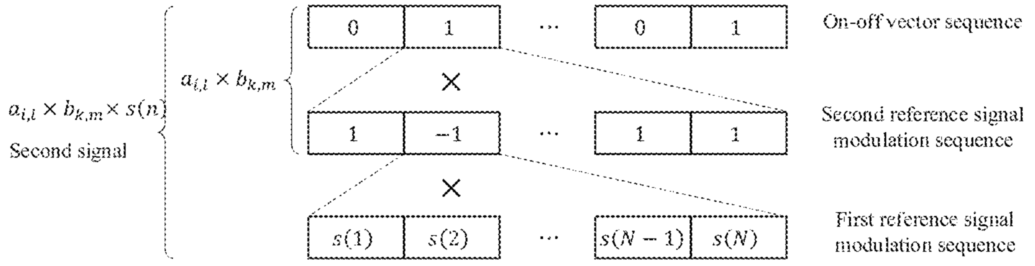
FIG. 4D is a schematic diagram of a modulation process in which a backscatter end performs signal modulation based on a third reference signal modulation sequence according to an embodiment of this application.

In this case, the backscatter end may use the third reference signal modulation sequence to modulate the first signal, as shown in FIG. 4D. On one hand, when the quantity of backscatter ends is greater than M, interference between the backscatter ends can be reduced. On the other hand, the backscatter end within off-duration can be further enabled to enter a silent state and collect battery energy to ensure continuity of the positioning process. Even if there are collisions between some second reference signal modulation sequences, the second communication device may position some backscatter ends.

S330. The backscatter end sends the second signal to the second communication device.

The second reference signal modulation sequence is an orthogonal sequence determined based on BPSK modulation information, and the third reference signal modulation sequence is determined based on the second reference signal modulation sequence.

It may be understood that, for an implementation process of S330, reference may be made to the related description in the method embodiment 200. To avoid repetition, details are not described herein again.

It should be noted that when receiving the target signal, the second communication device may position the first communication device, the second communication device, or a target backscatter end based on the target signal. The target signal includes at least the first signal sent by the first communication device and/or the second signal sent by at least one backscatter end.

Based on this, in an implementation, the process of positioning by the second communication device based on the target signal may include (11) to (13).

(11) In a case that the length of the second reference signal modulation sequence is 2 or 3, the second communication device positions the first communication device based on a sum of a first target signal and a second target signal, where the first target signal is a signal received by the second communication device in a first time unit, the second target signal is a signal received by the second communication device in a second time unit, and a phase of a modulation symbol in the second reference signal modulation sequence corresponding to the first time unit is opposite to a phase of a modulation symbol in the second reference signal modulation sequence corresponding to the second time unit. For example, the modulation symbol corresponding to the first time unit is b=1, and the modulation symbol corresponding to the second time unit is b=−1. For another example, the modulation symbol corresponding to the first time unit is b=−1 and the modulation symbol corresponding to the second time unit is b=1. Therefore, by calculating the sum of the first target signal and the second target signal, interference caused by the second signal sent by the backscatter end in the first time unit and the second time unit to a positioning signal of the first communication device can be canceled, and positioning accuracy can be improved.

For example, the sum of the first target signal and the second target signal is $y'[n]=y_m[n]+y_{m+1}[n]=2h_{sr}s[n]+w_m[n]+w_{m+1}[n]$.

For another example, in a case that the length of the second reference signal modulation sequence is 3, the sum of the first target signal and the second target signal is $y'[n]=y_{m+1}[n]+y_{m+2}[n]=2h_{sr}s[n]+w_{m+1}[n]+w_{m+2}[n]$.

It may be understood that $y_m[n]$ is a target signal received by the second communication device in an $m^{th}$ slot, as shown in the following equation:

$$y_m[n] = h_{sr}s[n] + \alpha\sum_{k=1}^{M} h_{st,k}h_{tr,k}b_{k,m}s[n] + \sum_{j=1}^{J}\alpha_j h_{st,j}^{(o)}h_{tr,j}^{(o)}s[n] + w_m[n],$$

where the first communication device sends a signal s[n] in an $n^{th}$ OFDM symbol, $|s[n]|^2=1$, the signal s[n] is directly received by a gNB with a channel response $h_{sr}$, and at the same time, the signal s[n] is received by a $k^{th}$ backscatter end with a channel response $h_{st,k}$. The first signal received by the $k^{th}$ backscatter end is modulated by a symbol $b_{k,m}$ in the second reference signal modulation sequence in slot m, and is reflected to the gNB with a channel response $h_{tr,k}$, and $\alpha$ is a complex attenuation backscatter signal coefficient. In addition, $\alpha_j$ is an attenuation coefficient of a $j^{th}$ unknown object including a rader cross section RCS, and $$h_{st,j}^{(o)}$$

and $$h_{tr,j}^{(o)}$$

are channel responses respectively for the first communication device and for a $j^{th}$ unknown reflector of the gNB. $w_m[n]$ is AWGN noise received in the $n^{th}$ symbol, an average value is 0, and noise power spectral density is $$\sigma_0^2.$$

Certainly, regarding $y_{m+1}[n]$ and $y_1[n]$ mentioned in this context, reference may be made to the related description of $y_m[n]$ mentioned subsequently. Details are not described again subsequently.

(12) In a case that the length of the second reference signal modulation sequence is greater than 3, the second communication device positions the first communication device based on a sum of a third target signal and a fourth target signal, where the third target signal is a signal received by the second communication device in an $(M+2)^{th}$ time unit, and the fourth target signal is a signal obtained by the second communication device by performing weighted processing on a signal received from the first time unit to an $(M+1)^{th}$ time unit.

In the case that the length of the second reference signal modulation sequence is greater than 3, the sum of the third target signal and the fourth target signal is $$y'[n] = y_{M+2}[n] + \frac{1}{M-1}\sum_{m=1}^{M+1} y_m[n].$$

(13) The process in which the second communication device positions the target backscatter end based on the target signal may include: if the target backscatter end is an $m^{th}$ backscatter end of the at least one backscatter end, in a case that the length of the second reference signal modulation sequence is 2, the second communication device positions the $m^{th}$ backscatter end based on a difference between a fifth target signal and a sixth target signal, where the fifth target signal is a signal received by the second communication device in a third time unit, the sixth target signal is a signal received by the second communication device in a fourth time unit, a modulation symbol corresponding to the third time unit is 1, and a modulation symbol corresponding to the fourth time unit is −1. Therefore, by calculating the difference between the fifth target signal and the sixth target signal, interference caused by the first signal sent by the first communication device in the third time unit and the fourth time unit to a positioning signal of the target backscatter end can be canceled, and positioning accuracy can be improved.

Based on this, in an implementation, the difference $y'_m[n]$ between the fifth target signal and the sixth target signal is:

$$\begin{aligned} y'_m[n] &= y_1[n] - y_{m+1}[n] \\ &= \alpha\sum_{k=1}^{M}(h_{st,m}h_{tr,m}b_{1,m} - h_{st,m}h_{tr,m}b_{k+1,m})s[n] + w_1[n] - w_{k+1}[n] \\ &= 2\alpha h_{st,k}h_{tr,k}s[n] + w_1[n] - w_{k+1}[n] \end{aligned}$$

where $h_{tr,m}$ is a channel response, α is an attenuation coefficient of an unknown reflector including an RCS, $h_{st,m}$ is a channel response between the first communication device and the $m^{th}$ backscatter end, $h_{tr,m}$ is a channel response between the second communication device and the $m^{th}$ backscatter end, $w_1[n]$ is AWGN noise received in a first time unit, $w_{k+1}[n]$ is AWGN noise received in a $(k+1)^{th}$ time unit, and s[n] is the first signal.

Based on this, the following describes the positioning process in the foregoing (11) to (13) based on the second reference signal modulation sequence or the third reference signal modulation sequence and in combination with Example 1 to Example 4. It should be noted that for ease of description, a reflected signal of an unknown reflector is not considered in Example 1 to Example 4.

Example 1

Figure 4E:
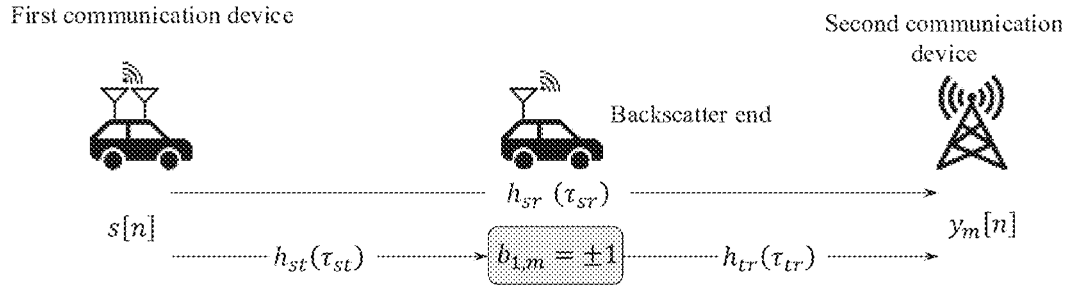
FIG. 4E is a fourth schematic structural diagram of a positioning system according to an embodiment of this application.

Assuming that the positioning scenario is shown in FIG. 4E, that is, a UU uplink positioning scenario in a bistatic backscatter scenario, that the time unit is a slot, and that the length of the second reference signal modulation sequence is 2 (M=1, that is, there is one backscatter end as shown in FIG. 4E), the target signal $y_m[n]$ received by the second communication device in the $m^{th}$ slot may be shown in an equation (3).

$$y_m[n] = h_{sr}s[n] + \alpha h_{st}h_{tr}b_{1,m}s[n] + w_m[n] \tag{3}$$

Assuming that the backscatter end corresponds to a modulation symbol $b_{1,m}=1$ in the second reference signal modulation sequence in slot m (that is, the first time unit), and corresponds to a modulation symbol $b_{1,m+1}=-1$ in the second reference signal modulation sequence in slot time m+1 (that is, the second time unit), the first target signal $y_m[n]$ and the second target signal $y_{m+1}[n]$ received by the backscatter end are shown in equations (4) respectively.

$$\begin{cases} y_m[n] = h_{sr}s[n] + \alpha h_{st}h_{tr}s[n] + w_m[n] \\ y_{m+1}[n] = h_{sr}s[n] - \alpha h_{st}h_{tr}s[n] + w_{m+1}[n] \end{cases} \tag{4}$$

It can be learned from the equations (4) that the second communication device can obtain a positioning signal y'[n] for the first communication device by performing an operation of $y_m[n]+y_{m+1}[n]$, as shown in an equation (5). Correspondingly, an SNR of the positioning signal y'[n] may be shown in an equation (6).

$$y'[n] = y_m[n] + y_{m+1}[n] = 2h_{sr}s[n] + w_m[n] + w_{m+1}[n] \tag{5}$$

$$SNR^{(p)}[n] = \frac{2|h_{sr}|^2}{\sigma^2} \tag{6}$$

It can be learned from the previous equation (5) that interference of the backscatter end to the positioning process of the first communication device can be completely canceled, and a better SNR gain can be obtained.

Optionally, similarly to the obtaining of the positioning signal y'[n] of the first communication device, the second communication device can obtain the positioning signal y'[n] (that is, the fifth target signal and the sixth target signal) for the backscatter end by performing an operation of $y_m[n]-y_{m+1}[n]$, as shown in an equation (7). Correspondingly, an SNR of the positioning signal y'[n] may be shown in an equation (8).

$$y'[n] = y_m[n] - y_{m+1}[n] = 2\alpha h_{st}h_{tr}s[n] + w_m[n] - w_{m+1}[n] \quad (7)$$

$$SNR^{(p)}[n] = \frac{2\alpha^2 \left| h_{st,k}h_{tr,k} \right|^2}{\sigma^2} \quad (8)$$

It can be learned from the previous equation (7) that interference of the first communication device to the positioning process of the backscatter end can be completely canceled, and a better SNR gain can be obtained.

Example 2

Assuming that the time unit is a slot, and that the length of the second reference signal modulation sequence is 3 (M=2, that is, there are two backscatter ends 1 and 2 in the positioning scenario), the target signal $y_m[n]$ received by the second communication device in the $m^{th}$ slot may be shown in an equation (9).

$$y_m[n] = h_{sr}s[n] + \alpha(h_{st,1}h_{tr,1}b_{1,m} + h_{st,2}h_{tr,2}b_{2,m}s[n] + w_m[n] \quad (9)$$

Assuming that a second reference signal modulation sequence used by a backscatter end 1 in slots m, m+1, and m+2 is $[b_{1,m}\ b_{1,m+1}\ b_{1,m+2}]=[1 -1\ 1]$, and that a second reference signal modulation sequence used by a backscatter end 2 in slots m, m+1, and m+2 is $[b_{2,m}\ b_{2,m+1}\ b_{2,m+2}]=[1\ 1 -1]$, target signals $y_m[n]$, $y_{m+1}[n]$, and $y_{m+2}[n]$ received by the second communication device in slots m, m+1, and m+2 may be shown in equations (10) respectively.

$$\begin{cases} y_m[n] = h_{sr}s[n] + \alpha(h_{st,1}h_{tr,1} + h_{st,2}h_{tr,2})s[n] + w_m[n] \\ y_{m+1}[n] = h_{sr}s[n] + \alpha(-h_{st,1}h_{tr,1} + h_{st,2}h_{tr,2})s[n] + w_{m+1}[n] \\ y_{m+2}[n] = h_{sr}s[n] + \alpha(h_{st,1}h_{tr,1} - h_{st,2}h_{tr,2})s[n] + w_{m+2}[n] \end{cases} \quad (10)$$

Based on this, the second communication device can obtain the positioning signal of the first communication device by performing an operation of $y_{m+1}[n]+y_{m+2}[n]$ (that is, the sum of the first target signal and the second target signal), as shown in an equation (11). Correspondingly, an SNR of the positioning signal y'[n] for the first communication device is shown in an equation (12).

$$y'[n] = y_{m+1}[n] + y_{m+2}[n] = 2h_{sr}s[n] + w_{m+1}[n] + w_{m+2}[n] \quad (11)$$

$$SNR^{(p)}[n] = \frac{2|h_{sr}|^2}{\sigma^2} \quad (12)$$

It can be learned from the previous equation (11) that interference of the backscatter end to the positioning process of the first communication device can be completely canceled, and a better SNR gain can be obtained.

In addition, the second communication device can obtain a positioning signal y'[n] for the backscatter end 1 by performing an operation of $y_m[n]-y_{m+1}[n]$, as shown in an equation (13), and obtain a positioning signal y'[n] for the backscatter end 2 by performing an operation of $y_m[n]-y_{m+2}[n]$, as shown in an equation (14). Correspondingly, an SNR of the positioning signal y'[n] for the backscatter ends 1 and 2 is shown in an equation (15).

$$y'[n] = y_m[n] - y_{m+1}[n] = 2\alpha h_{st,1}h_{tr,1}s[n] + w_m[n] - w_{m+1}[n] \quad (13)$$

$$y'[n] = y_m[n] - y_{m+2}[n] = 2\alpha h_{st,2}h_{tr,2}s[n] + w_m[n] - w_{m+2}[n] \quad (14)$$

$$SNR^{(p)}[n] = \frac{2\alpha^2|h_{st,k}h_{tr,k}|^2}{\sigma^2} \quad (15)$$

It can be learned from the previous equations (13) and (14) that interference of the first communication device to the positioning process of the backscatter end can be completely canceled, and a better SNR gain can be obtained.

Example 3

Assuming that the time unit is a slot, and that the length of the second reference signal modulation sequence is greater than 3 (M>2, that is, there are more than two backscatter ends in the positioning scenario), the target signal $y_m[n]$ received by the second communication device in the $m^{th}$ slot may be shown in an equation (16).

$$y_m[n] = h_{sr}s[n] + \alpha\sum_{k=1}^{M} h_{st,k}h_{tr,k}b_{k,m}s[n] + w_m[n] \quad (16)$$

Based on this, the second communication device can obtain the positioning signal y'[n] of the first communication device by using an equation (17), and an SNR of the positioning signal y'[n] may be shown in an equation (18).

$$\begin{aligned} y'[n] &= y_{m+2}[n] + \frac{1}{M-1}\sum\nolimits_{m=1}^{m+1} y_m[n] \\ &= h_{sr}s[n] + \frac{M+1}{M-1}h_{sr}s[n] + w_{m+2}[n] + \frac{1}{M-1}\sum\nolimits_{m=1}^{m+1} w_m[n] \\ &= \frac{2M}{M-1}h_{sr}s[n] + w_{m+2}[n] + \frac{1}{M-1}\sum\nolimits_{m=1}^{m+1} w_m[n] \end{aligned} \quad (17)$$

$$SNR^{(p)}[n] = \frac{\left(\frac{2M}{M-1}\right)^2}{\frac{2M}{M-1}} \times \frac{|h_{sr}|^2}{\sigma^2} = \frac{2M}{M-1} \times \frac{|h_{sr}|^2}{\sigma^2} \quad (18)$$

It can be learned from the previous equation (17) that interference of the backscatter end to the positioning process of the first communication device can be completely canceled, and a better SNR gain can be obtained.

Similarly, the second communication device can obtain the positioning signal y'[n] of the backscatter end by using an equation (19), and an SNR of the positioning signal y'[n] may be shown in an equation (20).

$$\begin{aligned} y'[n] &= y_1[n] - y_{k+1}[n] \\ &= \alpha\sum_{m=1}^{M}(h_{st,m}h_{tr,m}b_{1,m} - h_{st,m}h_{tr,m}b_{k+1,m})s[n] + w_1[n] - w_{k+1}[n] \\ &= 2\alpha h_{st,k}h_{tr,k}s[n] + w_1[n] - w_{k+1}[n] \end{aligned} \quad (19)$$

$$SNR_k^{(p)}[n] = \frac{2\alpha^2|h_{st,k}h_{tr,k}|^2}{\sigma^2} \quad (20)$$

It can be learned from the previous equation (19) that interference of the first communication device to the positioning process of the backscatter end can be completely canceled, and a better SNR gain can be obtained.

Example 4

Figure 4F:
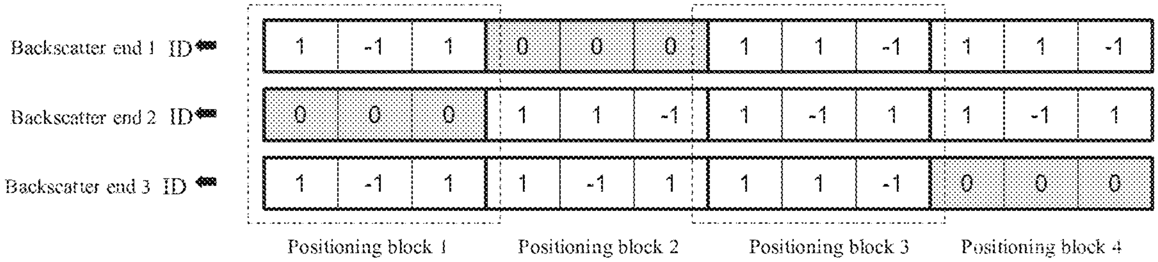
FIG. 4F is a third schematic diagram of a modulation process in which three backscatter ends perform signal modulation based on a second reference signal modulation sequence according to an embodiment of this application.

In Example 4, the backscatter end uses the third reference signal modulation sequence to modulate the first signal. Based on this, assuming that there is one first communication device, one second communication device, and three backscatter ends in the positioning scenario, and that the length of the second reference signal modulation sequence is 3, that is, M=2, and that a length of the on-off vector sequence is 4, that is, L=4, the length of the third reference signal modulation sequence is L×(M+1)=12. Referring to FIG. 4F, on-off vector sequences $A_1$, $A_2$ and $A_3$ corresponding to a backscatter end 1, a backscatter end 2, and a backscatter end 3 are shown in an equation (21).

$$\begin{bmatrix} A_1 \\ A_2 \\ A_3 \end{bmatrix} = \begin{bmatrix} a_{1,1} & a_{1,2} & a_{1,3} & a_{1,4} \\ a_{2,1} & a_{2,2} & a_{2,3} & a_{2,4} \\ a_{3,1} & a_{3,2} & a_{3,3} & a_{3,4} \end{bmatrix} = \begin{bmatrix} 1 & 0 & 1 & 1 \\ 0 & 1 & 1 & 1 \\ 1 & 1 & 1 & 0 \end{bmatrix} \tag{21}$$

In this case, the target signal $y_m[n]$ received by the second communication device in slot m is shown in an equation (22).

$$y_m[n] = h_{sr}s[n] + \alpha\sum_{k=1}^{3} h_{st,k}h_{tr,k}b_{k,m}s[n] + w_m[n] \tag{22}$$

Based on this, the second communication device positions the backscatter end in four different positioning blocks based on the on-off vector sequence. The following describes positioning cases of the four different positioning blocks separately.

Positioning Case of a Positioning Block 1

For the positioning block 1, target signals $y_m[n]$, $y_{m+1}$ [n], and $y_{m+2}[n]$ received by the second communication device in slots m, m+1, and m+2 are shown in equations (23) respectively.

$$\begin{cases} y_m[n] = h_{sr}s[n] + \alpha(h_{st,1}h_{tr,1} + h_{st,3}h_{tr,3})s[n] + w_m[n] \\ y_{m+1}[n] = h_{sr}s[n] - \alpha(h_{st,1}h_{tr,1} + h_{st,3}h_{tr,3})s[n] + w_{m+1}[n] \\ y_{m+2}[n] = h_{sr}s[n] + \alpha(h_{st,1}h_{tr,1} + h_{st,3}h_{tr,3})s[n] + w_{m+2}[n] \end{cases} \tag{23}$$

It can be learned from the equations (23) that the backscatter end 1 and the backscatter end 3 completely collide. Therefore, the second communication device cannot obtain positioning parameters required by the backscatter end 1 and the backscatter end 3 (such as a time difference of arrival (TDoA)), but the second communication device can obtain the positioning signal y'[n] of the first communication device by using an equation (24). Correspondingly, an SNR of the positioning signal y'[n] for the first communication device is shown in an equation (25).

$$\begin{aligned} y'[n] &= \frac{y_m[n] + y_{m+2}[n]}{2} + y_{m+1}[n] \\ &= 2h_{sr}s[n] + \frac{w_m[n] + w_{m+2}[n]}{2} + w_{m+1}[n] \end{aligned} \tag{24}$$

$$SNR^{(p)}[n] = \frac{8|h_{sr}|^2}{3\sigma^2} \tag{25}$$

It can be learned from the previous equation (24) that interference of the backscatter end to the positioning process of the first communication device can be completely canceled, and a better SNR gain can be obtained.

Positioning Case of a Positioning Block 2

For the positioning block 2, the second communication device can simultaneously obtain the positioning signals of the first communication device, the backscatter end 2, and the backscatter end 3, and can cancel interference between the backscatter end and the first communication device, and interference between the backscatter end 2 and the backscatter end 3.

Positioning Case of a Positioning Block 3

For the positioning block 3, the backscatter end 1 and the backscatter end 3 collide, but there is no impact on the backscatter end 2. Based on this, target signals $y_m[n]$, $y_{m+1}[n]$, and $y_{m+2}[n]$ received by the second communication device in different slots m, m+1, and m+2 are shown in equations (26) respectively.

$$\begin{cases} y_m[n] = h_{sr}s[n] + \alpha(h_{st,1}h_{tr,1} + h_{st,2}h_{tr,2} + h_{st,3}h_{tr,3})s[n] + w_m[n] \\ y_{m+1}[n] = h_{sr}s[n] + \alpha(h_{st,1}h_{tr,1} - h_{st,2}h_{tr,2} + h_{st,3}h_{tr,3})s[n] + w_{m+1}[n] \\ y_{m+2}[n] = h_{sr}s[n] + \alpha(-h_{st,1}h_{tr,1} + h_{st,2}h_{tr,2} - h_{st,3}h_{tr,3})s[n] + w_{m+2}[n] \end{cases} \tag{26}$$

It can be learned from the equations (26) that the backscatter end 1 and the backscatter end 3 completely collide. Therefore, the second communication device cannot obtain positioning parameters (such as a time difference of arrival (TDoA)) required by the backscatter end 1 and the backscatter end 3. However, for the first communication device, the second communication device can obtain the positioning signal of the first communication device by using an equation (27), and a corresponding SNR is shown in an equation (28).

$$y'[n] = y_{m+2}[n] + y_{m+1}[n] = 2h_{sr}s[n] + w_{m+1}[n] + w_{m+2}[n] \tag{27}$$

$$SNR^{(p)}[n] = \frac{2|h_{sr}|^2}{\sigma^2} \tag{28}$$

In addition, because the backscatter end 2 does not collide with the backscatter end 1 and the backscatter end 3, the second communication device can obtain the positioning signal of the backscatter end 2 by using an equation (29), and a corresponding SNR is shown in an equation (30).

$$y'[n] = y_m[n] - y_{m+1}[n] = 2\alpha h_{st,2}h_{tr,2} + w_m[n] - w_{m+1}[n] \tag{29}$$

$$SNR^{(p)}[n] = \frac{2\alpha^2|h_{st,2}h_{tr,2}|^2}{\sigma^2} \tag{30}$$

Positioning Case of a Positioning Block 4

For the positioning block 4, the second communication device can simultaneously obtain the positioning signals of the first communication device, the backscatter end 1, and the backscatter end 2, and can cancel interference between the backscatter end and the first communication device, and interference between the backscatter end 1 and the backscatter end 2. For a processing process, reference may be made to the foregoing description. Details are not described again herein.

Example 5

Figure 4G:
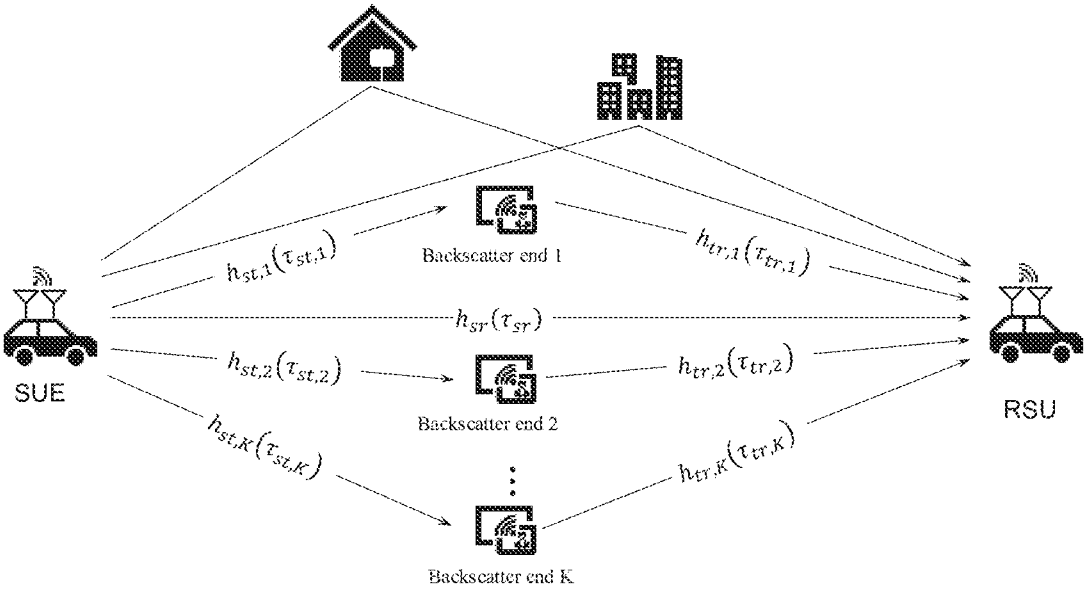
FIG. 4G is a fifth schematic structural diagram of a positioning system according to an embodiment of this application.

Assuming that the positioning scenario is a sidelink positioning scenario shown in FIG. 4G, that is, a sidelink positioning scenario in a bistatic backscatter scenario, and that the time unit is a slot, and that the first communication device is sidelink UE (SUE), and that the second communication device is a road side unit (RSU), for one SUE, it is difficult to find more than four RSUs around the SUE. It is also possible to position the SUE through other surrounding SUEs. However, due to mobility of the SUE, a location of the SUE itself is very inaccurate. Therefore, overall sidelink positioning accuracy is greatly reduced. To improve accuracy of sidelink positioning, dense deployment of RSUs is indispensable, but this greatly increases sidelink deployment costs.

In this regard, this application uses characteristics of backscatter to implement assisted positioning of the SUE. For example, with reference to FIG. 4E again, assuming that there is one SUE, one RSU, K backscatter ends, and J unknown reflectors (Object), the target signal received by the RSU in the $m^{th}$ slot may be shown in an equation (31).

$$y_m[n] = h_{sr}(\tau_{sr})s[n] + \alpha\sum_{k=1}^{K} h_{st,k}(\tau_{st,k})h_{tr,k}(\tau_{tr,k})b_{k,m}s[n] + \sum_{j=1}^{J}\alpha_j h_{st,j}^{(o)}h_{tr,j}^{(o)}s[n] + w_m[n] \quad (31)$$

The SUE sends a positioning reference signal s[n] in the $n^{th}$ symbol, s[n] is directly received by the RSU with a channel response $h_{sr}(\tau_{sr})$ ($\tau_{sr}$ is a channel delay), and at the same time, s[n] is received by a $k^{th}$ backscatter end with a channel response $h_{st,k}(\tau_{st,k})$ ($\tau_{st,k}$ is a channel delay). The first signal received by the $k^{th}$ backscatter end is modulated by a symbol $b_{k,m}$ in the second reference signal modulation sequence in slot m, and is reflected to the RSU with a channel response $h_{tr,k}(\tau_{tr,k})$ ($\tau_{tr,k}$ is a channel delay), and $\alpha$ is a complex attenuation backscatter signal coefficient. In addition, $\alpha_j$ is an attenuation coefficient of a $j^{th}$ unknown reflector including an RCS, and $$h_{st,j}^{(o)} \text{ and } h_{tr,j}^{(o)}$$

are respectively channel responses for the SUE and for the $j^{th}$ unknown reflector of the RSU. $w_m[n]$ is AWGN noise received in the $n^{th}$ symbol, an average value is 0, and noise power spectral density is $$\sigma_0^2.$$

An SUE positioning signal assisted by the backscatter end can be obtained from a signal transmitted by the $m^{th}$ backscatter end. For example, according to an equation (32), a subtraction operation is performed on a signal in an $(m+1)^{th}$ slot and a signal in a first slot, to implement positioning of the SUE.

$$y'_m[n] = y_{m+1}[n] - y_1[n] = 2\alpha h_{st,m}(\tau_{st,m})h_{tr,m}(\tau_{tr,m})s[n] + w_{m+1}[n] - w_1[n] \quad (32)$$

By using the equation (32), the RSU can calculate a total delay time of the first signal sent by the SUE to the RSU through reflection by the ml backscatter end, that is, $\tau_{st,m}=\tau_{tr,m}$.

Assuming that a geographical location of each backscatter end is fixed, and that the RSU accurately knows the geographical location of each backscatter end in advance, the RSU can accurately know in advance a delay time of the second signal sent by the $m^{th}$ backscatter end to the RSU, that is, $\tau_{tr,m}$. By performing a subtraction operation on the total delay time $\tau_{st,m}=\tau_{tr,m}$, the RSU can obtain the delay of the first signal sent by the SUE to the $m^{th}$ backscatter end, that is, $\tau_{st,m}$. If more than four backscatter ends are deployed in advance for each RSU to assist in positioning the SUE (that is, K≥4), only one RSU is required to accurately position the SUE.

Certainly, in addition to the positioning directly performed by the second communication device based on the target signal provided above, considering that there is no information interaction between the backscatter ends, it is inevitable that reflected signals of the backscatter ends collide at the same time (for example, different backscatter ends select the same second reference signal modulation sequence). In this regard, if reflected signals (that is, second signals) of a few backscatter ends collide, the second communication device can distinguish and determine IDs of the backscatter ends and corresponding coordinate positions by using a positioning algorithm. However, if reflected signals (that is, second signals) of a few backscatter ends collide, the second communication device may be unable to effectively resolve a collision problem of the reflected signals of the backscatter ends, and therefore cannot implement effective positioning. Alternatively, possibly due to limitations in computing power or hardware capabilities of the second communication device, the second communication device cannot position at least one of the first communication device, the second communication device, or the at least one backscatter end based on the first signal and/or at least one second signal.

In this case, the second communication device may obtain at least one of a first measurement parameter, a second measurement parameter, or a third measurement parameter based on the first signal and/or the at least one second signal, and send the at least one of the first measurement parameter, the second measurement parameter, or the third measurement parameter to a sensing function (SF). The SF uses unsupervised learning of an expectation maximization (EM) algorithm (K-Means Clustering) to classify received positioning data (such as the third measurement parameter) corresponding to the backscatter end. Then the SF uses a positioning algorithm to estimate a location or velocity of the backscatter end. It should be noted that the EM is mainly used in a scenario in which the backscatter ends collide with each other.

For example, the second communication device can obtain location information of a plurality of backscatter ends at the same time by using a specific positioning algorithm (such as multiple signal classification (MUSIC)). In this case, if the second communication device cannot determine locations of the backscatter ends and related information of IDs of the backscatter ends due to collisions between the backscatter ends, the second communication device may send at least one of the first measurement parameter, the second measurement parameter, or the third measurement parameter to the SF, so that the SF can comprehensively determine the location information of the backscatter ends and ID information of the backscatter ends.

It should be noted that the first measurement parameter is used for positioning the first communication device, and the second measurement parameter is used for positioning the second communication device, and the third measurement parameter is used for positioning the at least one backscatter end. For example, the first measurement parameter, the second measurement parameter, and the third measurement parameter may include but are not limited to TDoA and time of arrival (ToA) parameters, or the like.

Figure 5:
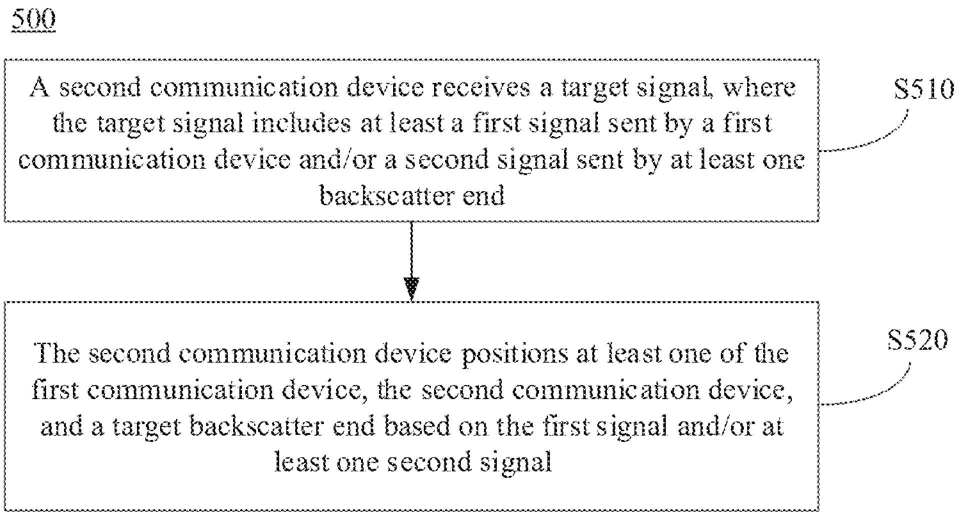
FIG. 5 is a third schematic flowchart of a positioning method according to an embodiment of this application.

FIG. 5 is a schematic flowchart of a positioning method 500 according to an exemplary embodiment of this application. The method 500 may be performed by a second communication device, but this is not limited. The method may be performed by hardware and/or software installed in the second communication device. In this embodiment, the method 500 may include at least the following steps.

S510. A second communication device receives a target signal, where the target signal includes at least a first signal sent by a first communication device and/or a second signal sent by at least one backscatter end.

S520. The second communication device positions at least one of the first communication device, the second communication device, or a target backscatter end based on the first signal and/or at least one second signal.

The target backscatter end is any one of the at least one backscatter end, the second signal is obtained by modulating the first signal based on a second reference signal modulation sequence or a third reference signal modulation sequence, the second reference signal modulation sequence is an orthogonal sequence determined based on binary phase shift keying BPSK modulation information, and the third reference signal modulation sequence is determined based on the second reference signal modulation sequence.

Optionally, the second reference signal modulation sequence includes M+x modulation symbols, x is 1 or 2, M is related to a quantity of backscatter ends participating in a positioning process, and M is an integer greater than or equal to 1; and modulation duration corresponding to a first reference signal modulation sequence and modulation duration corresponding to the second reference signal modulation sequence are in an M+x times relationship, and the first signal is obtained based on the first reference signal modulation sequence.

Optionally, the first reference signal modulation sequence includes a positioning reference signal modulation sequence; and/or the second reference signal modulation sequence includes a positioning reference signal modulation sequence.

Optionally, the step in which the second communication device positions the first communication device based on the first signal and/or at least one second signal includes either of the following: in a case that a length of the second reference signal modulation sequence is 2 or 3, the second communication device positions the first communication device based on a sum of a first target signal and a second target signal, where the first target signal is a signal received by the second communication device in a first time unit, the second target signal is a signal received by the second communication device in a second time unit, and a phase of a modulation symbol in the second reference signal modulation sequence corresponding to the first time unit is opposite to a phase of a modulation symbol in the second reference signal modulation sequence corresponding to the second time unit; and in a case that the length of the second reference signal modulation sequence is greater than 3, the second communication device positions the first communication device based on a sum of a third target signal and a fourth target signal, where the third target signal is a signal received by the second communication device in an $(M+2)^{th}$ time unit, and the fourth target signal is a signal obtained by the second communication device by performing weighted processing on a signal received from the first time unit to an $(M+1)^{th}$ time unit.

Optionally, in a case that the length of the second reference signal modulation sequence is 2, the sum of the first target signal and the second target signal is $y'[n]=y_m[n]+y_{m+1}[n]=2h_{sr}s[n]+w_m[n]+w_{m+1}[n]$; in a case that the length of the second reference signal modulation sequence is 3, the sum of the first target signal and the second target signal is $y'[n]=y_{m+1}[n]+y_{m+2}[n]=2h_{sr}s[n]+w_{m+1}[n]+w_{m+2}[n]$; or in the case that the length of the second reference signal modulation sequence is greater than 3, the sum of the third target signal and the fourth target signal is $$y'[n] = y_{M+2}[n] + \frac{1}{M-1}\sum_{m=1}^{M+1} y_m[n].$$

Optionally, the step in which the second communication device positions the target backscatter end based on the first signal and/or at least one second signal includes: if the target backscatter end is an m backscatter end of the at least one backscatter end, in a case that the length of the second reference signal modulation sequence is 2, the second communication device positions the $m^{th}$ backscatter end based on a difference between a fifth target signal and a sixth target signal, where the fifth target signal is a signal received by the second communication device in a third time unit, the sixth target signal is a signal received by the second communication device in a fourth time unit, a modulation symbol corresponding to the third time unit is 1, and a modulation symbol corresponding to the fourth time unit is −1.

Optionally, the difference y'[n] between the fifth target signal and the sixth target $$\begin{aligned}\text{signal is: } y'_m[n] &= y_1[n] - y_{m+1}[n] \\ &= \alpha\sum_{k=1}^{M}(h_{st,m}h_{tr,m}b_{1,m} - h_{st,m}h_{tr,m}b_{k+1,m})s[n] + w_1[n] - \\ &\quad w_{k+1}[n], \text{ where } h_{tr,m} \text{ is a channel} \\ &= 2\alpha h_{st,k}h_{tr,k}s[n] + w_1[n] - w_{k+1}[n]\end{aligned}$$

response, α is an attenuation coefficient of an unknown reflector including an RCS, $h_{st,m}$ is a channel response between the first communication device and the $m^{th}$ backscatter end, $h_{tr,m}$ is a channel response between the second communication device and the ml backscatter end, $w_1[n]$ is AWGN noise received in a first time unit, $w_{k+1}[n]$ is AWGN noise received in a $(k+1)^{th}$ time unit, and s[n] is the first signal.

Optionally, the step in which the second communication device positions at least one of the first communication device, the second communication device, or the target backscatter end based on the first signal and/or at least one second signal includes: the second communication device obtains at least one of a first measurement parameter, a second measurement parameter, or a third measurement parameter based on the first signal and/or the at least one second signal; and the second communication device sends the at least one of the first measurement parameter, the second measurement parameter, or the third measurement parameter to a sensing function, where the first measurement parameter is used for positioning the first communication device, the second measurement parameter is used for positioning the second communication device, and the third measurement parameter is used for positioning the at least one backscatter end.

Optionally, in a case that a positioning scenario is a UU uplink positioning scenario, the first communication device is a terminal, and the second communication device is a network-side device; in a case that a positioning scenario is a UU downlink positioning scenario, the first communication device is a network-side device, and the second communication device is a terminal; or in a case that a positioning scenario is a sidelink positioning scenario, both the first communication device and the second communication device are terminals.

It may be understood that for the implementation process of each implementation in the method embodiment 500, reference may be made to the related descriptions in the method embodiments 200 and 300, with the same or corresponding technical effect achieved. To avoid repetition, details are not described herein again.

Figure 6:
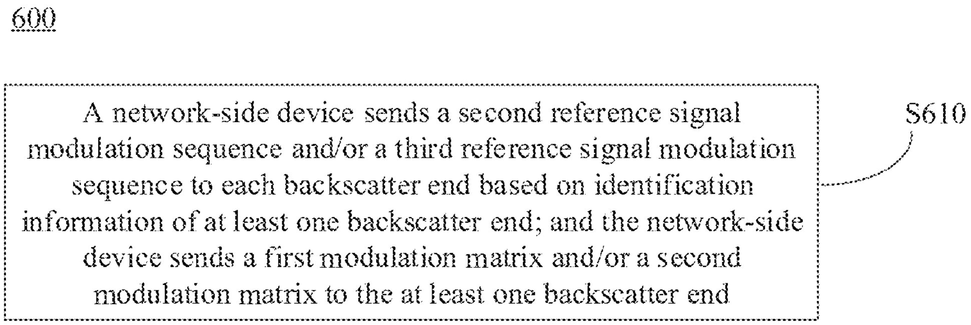
FIG. 6 is a fourth schematic flowchart of a positioning method according to an embodiment of this application.

FIG. 6 is a schematic flowchart of a positioning method 600 according to an exemplary embodiment of this application. The method 600 may be performed by a network-side device, but this is not limited. The method may be performed by hardware and/or software installed in the network-side device. In this embodiment, the method 600 may include at least the following step.

S610. A network-side device sends a second reference signal modulation sequence and/or a third reference signal modulation sequence to each backscatter end based on identification information of at least one backscatter end; and the network-side device sends a first modulation matrix and/or a second modulation matrix to the at least one backscatter end.

The second reference signal modulation sequence is any one of a plurality of row vectors included in the first modulation matrix, and the second reference signal modulation sequence is an orthogonal sequence determined based on binary phase shift keying BPSK modulation information; and the third reference signal modulation sequence is any one of a plurality of row vectors included in the second modulation matrix, and the third reference signal modulation sequence is determined based on the second reference signal modulation sequence.

Optionally, for the at least one backscatter end, at least part of the second reference signal modulation sequence corresponding to each backscatter end is different.

Optionally, a first element in each row vector in the first modulation matrix is −1, and second elements other than the first element are all 1.

Optionally, each element in a first column vector in the first modulation matrix is 1.

Optionally, the first modulation matrix B is:

$$B=\begin{bmatrix}B_1\\B_2\\\vdots\\B_N\end{bmatrix}=\begin{bmatrix}b_{1,1}&b_{1,2}&\cdots&b_{1,M+1}\\b_{2,1}&b_{2,2}&\cdots&b_{2,M+1}\\\vdots&\vdots&\ddots&\vdots\\b_{M,1}&b_{M,2}&\ldots&b_{M,M+1}\end{bmatrix}=\begin{bmatrix}1&-1&1&\ldots&1\\1&1&-1&\ldots&1\\\vdots&\vdots&\vdots&\ddots&\vdots\\1&1&1&\ldots&-1\end{bmatrix},$$

where M is an integer greater than or equal to 1.

Optionally, in a case that a length of the second reference signal modulation sequence is greater than 3, the first modulation matrix further includes a second column vector, and each element in the second column vector is −1.

Optionally, the first modulation matrix B is:

$$B=\begin{bmatrix}B_1\\B_2\\\vdots\\B_M\end{bmatrix}=\begin{bmatrix}b_{1,1}&b_{1,2}&\cdots&b_{1,M+1}\\b_{2,1}&b_{2,2}&\cdots&b_{2,M+1}\\\vdots&\vdots&\ddots&\vdots\\b_{M,1}&b_{M,2}&\ldots&b_{M,M+1}\end{bmatrix}=\begin{bmatrix}1&-1&1&\ldots&1&-1\\1&1&-1&\ldots&1&-1\\1&\vdots&\vdots&-1&\vdots&\vdots\\1&1&1&\ldots&-1&-1\end{bmatrix},$$

where M is an integer greater than or equal to 3.

Optionally, the step in which the network-side device determines the third reference signal modulation sequence based on the second reference signal modulation sequence includes: the network-side device multiplies the second reference signal modulation sequence by an on-off vector sequence to obtain the third reference signal modulation sequence, where elements in the on-off vector sequence include at least one third element and at least one fourth element, the third element is 0, and the fourth element is 1.

Optionally, a quantity of elements in the on-off vector sequence A is L, and duration corresponding to the second reference signal modulation sequence and duration corresponding to the third reference signal modulation sequence are in an L times relationship.

Optionally, the on-off vector sequence A is: A=[0 1 . . . 0 1].

It may be understood that for the implementation process of each implementation in the method embodiment 600, reference may be made to the related descriptions in the method embodiments 200 and 300, with the same or corresponding technical effect achieved. To avoid repetition, details are not described herein again.

The positioning method provided in this embodiment of this application may be performed by a positioning apparatus. A positioning apparatus provided in an embodiment of this application is described by assuming that the positioning apparatus performs the positioning method in this embodiment of this application.

Figure 7:
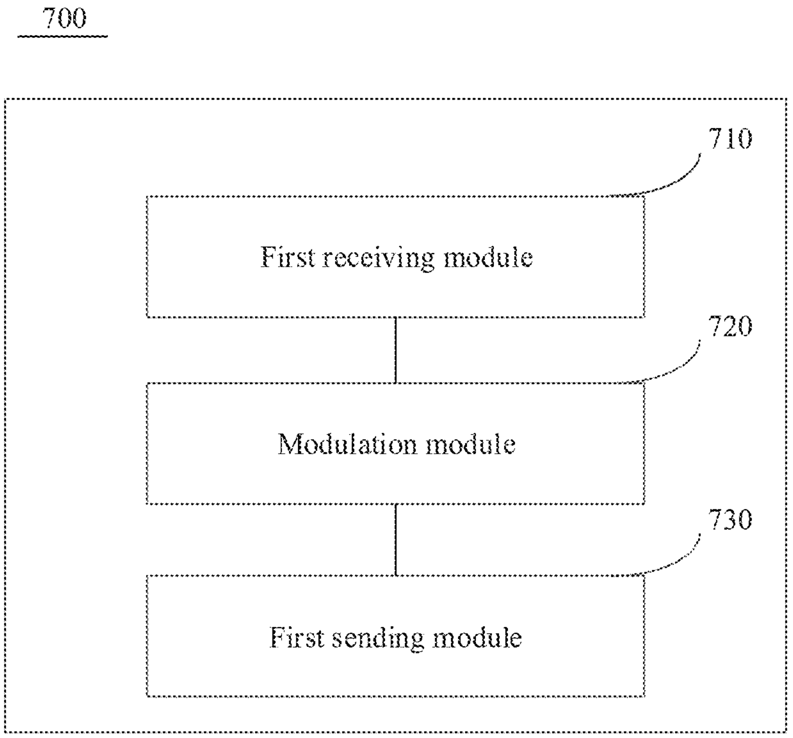
FIG. 7 is a first schematic structural diagram of a positioning apparatus according to an embodiment of this application.

FIG. 7 is a schematic structural diagram of a positioning apparatus 700 according to an exemplary embodiment of this application. The positioning apparatus 700 includes: a first receiving module, configured to receive a first signal sent by a first communication device; a modulation module, configured to modulate the first signal based on a second reference signal modulation sequence or a third reference signal modulation sequence to obtain a second signal; and a first sending module, configured to send the second signal to a second communication device, where the second reference signal modulation sequence is an orthogonal sequence determined based on binary phase shift keying BPSK modulation information, and the third reference signal modulation sequence is determined based on the second reference signal modulation sequence.

Optionally, the second reference signal modulation sequence includes M+x modulation symbols, x is 1 or 2, M is related to a quantity of backscatter ends participating in a positioning process, and M is an integer greater than or equal to 1; and modulation duration corresponding to a first reference signal modulation sequence and modulation duration corresponding to the second reference signal modulation sequence are in an M+x times relationship, and the first signal is obtained based on the first reference signal modulation sequence.

Optionally, at least one of the first reference signal modulation sequence or the second reference signal modulation sequence includes a positioning reference signal modulation sequence.

Optionally, the first receiving module is further configured to obtain the second reference signal modulation sequence from a network-side device, where the second reference signal modulation sequence is selected by the network-side device, based on identification information of the backscatter end, from a plurality of row vectors included in a first modulation matrix; the first receiving module is further configured to obtain the third reference signal modulation sequence from the network-side device, where the third reference signal modulation sequence is selected by the network-side device, based on the identification information of the backscatter end, from a plurality of row vectors included in a second modulation matrix; the first receiving module is further configured to obtain the first modulation matrix from the network-side device, and selects, based on the identification information of the backscatter end, the second reference signal modulation sequence from the plurality of row vectors included in the first modulation matrix; the first receiving module is further configured to obtain the second modulation matrix from the network-side device, and selects, based on the identification information of the backscatter end, the third reference signal modulation sequence from the plurality of row vectors included in the second modulation matrix; or the first receiving module is further configured to obtain the second reference signal modulation sequence from the network-side device, and determines the third reference signal modulation sequence based on the second reference signal modulation sequence.

Optionally, a first element in each row vector in the first modulation matrix is −1, second elements other than the first element are all 1, and a position of the first element in each row vector is different.

Optionally, each element in a first column vector in the first modulation matrix is 1.

Optionally, the first modulation matrix B is:

$$B=\begin{bmatrix} B_1 \\ B_2 \\ \vdots \\ B_M \end{bmatrix}=\begin{bmatrix} b_{1,1} & b_{1,2} & \cdots & b_{1,M+1} \\ b_{2,1} & b_{2,2} & \cdots & b_{2,M+1} \\ \vdots & \vdots & \ddots & \vdots \\ b_{M,1} & b_{M,2} & \ldots & b_{M,M+1} \end{bmatrix}=\begin{bmatrix} 1 & -1 & 1 & \ldots & 1 \\ 1 & 1 & -1 & \ldots & 1 \\ \vdots & \vdots & \vdots & \ddots & \vdots \\ 1 & 1 & 1 & \ldots & -1 \end{bmatrix}.$$

Optionally, in a case that a length of the second reference signal modulation sequence is greater than 3, the first modulation matrix further includes a second column vector, and each element in the second column vector is −1.

Optionally, the first modulation matrix B is:

$$B=\begin{bmatrix} B_1 \\ B_2 \\ \vdots \\ B_M \end{bmatrix}=\begin{bmatrix} b_{1,1} & b_{1,2} & \cdots & b_{1,M+1} \\ b_{2,1} & b_{2,2} & \cdots & b_{2,M+1} \\ \vdots & \vdots & \ddots & \vdots \\ b_{M,1} & b_{M,2} & \ldots & b_{M,M+1} \end{bmatrix}=\begin{bmatrix} 1 & -1 & 1 & \ldots & 1 & -1 \\ 1 & 1 & -1 & \ldots & 1 & -1 \\ 1 & \vdots & \vdots & -1 & \vdots & \vdots \\ 1 & 1 & 1 & \ldots & -1 & -1 \end{bmatrix}.$$

Optionally, the modulation module is configured to multiply the second reference signal modulation sequence by an on-off vector sequence to obtain the third reference signal modulation sequence, where elements in the on-off vector sequence include at least one third element and at least one fourth element, the third element is 0, and the fourth element is 1.

Optionally, a quantity of elements in the on-off vector sequence is L, and the modulation duration corresponding to the second reference signal modulation sequence and modulation duration corresponding to the on-off vector sequence are in an L times relationship.

Optionally, the on-off vector sequence A is: A=[0 1 . . . 0 1].

Optionally, in a case that a positioning scenario is a UU uplink positioning scenario, the first communication device is a terminal, and the second communication device is the network-side device; in a case that a positioning scenario is a UU downlink positioning scenario, the first communication device is the network-side device, and the second communication device is a terminal; or in a case that a positioning scenario is a sidelink positioning scenario, both the first communication device and the second communication device are terminals.

Figure 8:
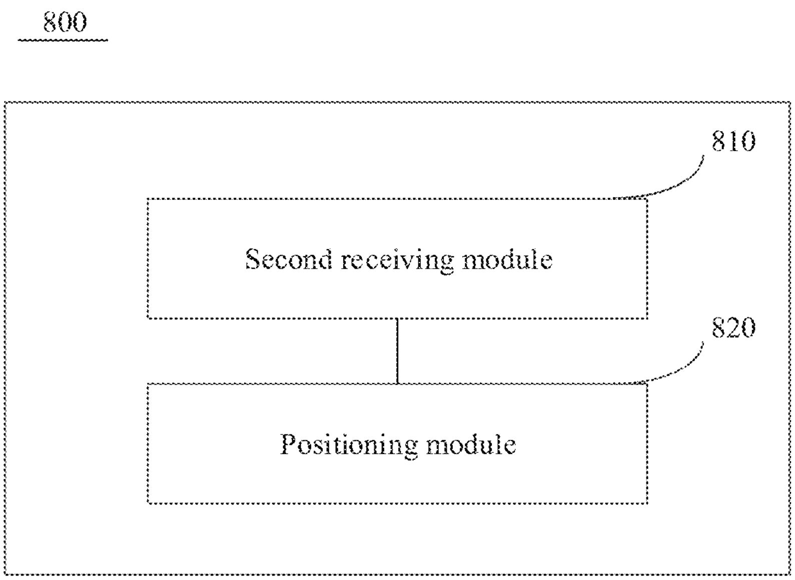
FIG. 8 is a second schematic structural diagram of a positioning apparatus according to an embodiment of this application.

FIG. 8 is a schematic structural diagram of a positioning apparatus 800 according to an exemplary embodiment of this application. The positioning apparatus 800 includes: a second receiving module, configured to receive a target signal, where the target signal includes at least a first signal sent by a first communication device and/or a second signal sent by at least one backscatter end; and a positioning module, configured to position at least one of the first communication device, the second communication device, or a target backscatter end based on the first signal and/or at least one second signal, where the target backscatter end is any one of the at least one backscatter end, the second signal is obtained by modulating the first signal based on a second reference signal modulation sequence or a third reference signal modulation sequence, the second reference signal modulation sequence is an orthogonal sequence determined based on binary phase shift keying BPSK modulation information, and the third reference signal modulation sequence is determined based on the second reference signal modulation sequence.

Optionally, the second reference signal modulation sequence includes M+x modulation symbols, x is 1 or 2, M is related to a quantity of backscatter ends participating in a positioning process, and M is an integer greater than or equal to 1; and modulation duration corresponding to a first reference signal modulation sequence and modulation duration corresponding to the second reference signal modulation sequence are in an M+x times relationship, and the first signal is obtained based on the first reference signal modulation sequence.

Optionally, the first reference signal modulation sequence includes a positioning reference signal modulation sequence; and/or the second reference signal modulation sequence includes a positioning reference signal modulation sequence.

Optionally, the positioning module is configured to: in a case that a length of the second reference signal modulation sequence is 2 or 3, position the first communication device based on a sum of a first target signal and a second target signal, where the first target signal is a signal received by the second communication device in a first time unit, the second target signal is a signal received by the second communication device in a second time unit, and a phase of a modulation symbol in the second reference signal modulation sequence corresponding to the first time unit is opposite to a phase of a modulation symbol in the second reference signal modulation sequence corresponding to the second time unit; and in a case that the length of the second reference signal modulation sequence is greater than 3, position the first communication device based on a sum of a third target signal and a fourth target signal, where the third target signal is a signal received by the second communication device in an $(M+2)^{th}$ time unit, and the fourth target signal is a signal obtained by the second communication device by performing weighted processing on a signal received from the first time unit to an $(M+1)^{th}$ time unit.

Optionally, in a case that the length of the second reference signal modulation sequence is 2, the sum of the first target signal and the second target signal is $y'[n]=y_m[n]+y_{m+1}[n]=2h_{sr}s[n]+w_m[n]+w_{m+1}[n]$; in a case that the length of the second reference signal modulation sequence is 3, the sum of the first target signal and the second target signal is $y'[n]=y_{m+1}[n]+y_{m+2}[n]=2h_{sr}s[n]+w_{m+1}[n]+w_{m+2}[n]$; or in the case that the length of the second reference signal modulation sequence is greater than 3, the sum of the third target signal and the fourth target signal is $$y'[n]=y_{M+2}[n]+\frac{1}{M-1}\sum_{m=1}^{M+1}y_m[n].$$

Optionally, the positioning module is configured to: if the target backscatter end is an $m^{th}$ backscatter end of the at least one backscatter end, in a case that the length of the second reference signal modulation sequence is 2, position the $m^{th}$ backscatter end based on a difference between a fifth target signal and a sixth target signal, where the fifth target signal is a signal received by the second communication device in a third time unit, the sixth target signal is a signal received by the second communication device in a fourth time unit, a modulation symbol corresponding to the third time unit is 1, and a modulation symbol corresponding to the fourth time unit is −1.

Optionally, the difference $y_m'[n]$ between the fifth target signal and the sixth target signal is: $y'_m[n]=y_1[n]-y_{m+1}[n]$, where $h_{tr,m}$ is a channel $$\begin{aligned}&=\alpha\sum_{k=1}^{M}(h_{st,m}h_{tr,m}b_{1,m}-h_{st,m}h_{tr,m}b_{k+1,m})s[n]+\\&\quad w_1[n]-w_{k+1}[n]\\&=2\alpha h_{st,k}h_{tr,k}s[n]+w_1[n]-w_{k+1}[n]\end{aligned}$$

response, α is an attenuation coefficient of an unknown reflector including an RCS, $h_{st,m}$ is a channel response between the first communication device and the $m^{th}$ backscatter end, $h_{tr,m}$ is a channel response between the second communication device and the ml backscatter end, $w_1[n]$ is AWGN noise received in a first time unit, $w_{k+1}[n]$ is AWGN noise received in a $(k+1)^{th}$ time unit, and s[n] is the first signal.

Optionally, the second receiving module is configured to obtain at least one of a first measurement parameter, a second measurement parameter, or a third measurement parameter based on the first signal and/or the at least one second signal; and the second communication device sends the at least one of the first measurement parameter, the second measurement parameter, or the third measurement parameter to a sensing function, where the first measurement parameter is used for positioning the first communication device, the second measurement parameter is used for positioning the second communication device, and the third measurement parameter is used for positioning the at least one backscatter end.

Optionally, in a case that a positioning scenario is a UU uplink positioning scenario, the first communication device is a terminal, and the second communication device is a network-side device; in a case that a positioning scenario is a UU downlink positioning scenario, the first communication device is a network-side device, and the second communication device is a terminal; or in a case that a positioning scenario is a sidelink positioning scenario, both the first communication device and the second communication device are terminals.

Figure 9:
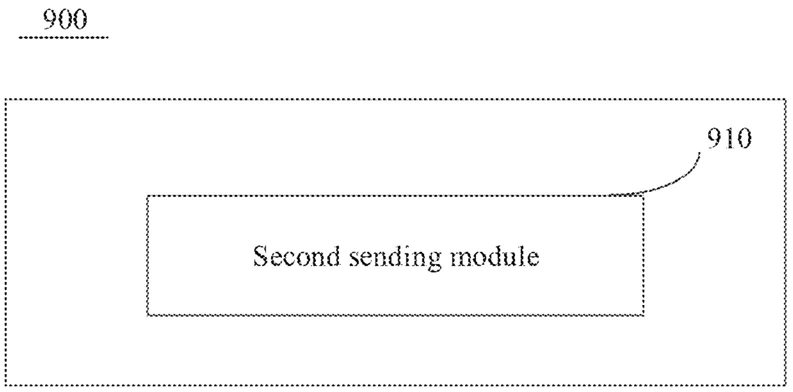
FIG. 9 is a third schematic structural diagram of a positioning apparatus according to an embodiment of this application.

FIG. 9 is a schematic structural diagram of a positioning apparatus 900 according to an exemplary embodiment of this application. The positioning apparatus 900 includes: a second sending module, configured to send a second reference signal modulation sequence and/or a third reference signal modulation sequence to each backscatter end based on identification information of at least one backscatter end; or configured to send a first modulation matrix and/or a second modulation matrix to the at least one backscatter end, where the second reference signal modulation sequence is any one of a plurality of row vectors included in the first modulation matrix, and the second reference signal modulation sequence is an orthogonal sequence determined based on binary phase shift keying BPSK modulation information; and the third reference signal modulation sequence is any one of a plurality of row vectors included in the second modulation matrix, and the third reference signal modulation sequence is determined based on the second reference signal modulation sequence.

Optionally, for the at least one backscatter end, at least part of the second reference signal modulation sequence corresponding to each backscatter end is different.

Optionally, a first element in each row vector in the first modulation matrix is −1, and second elements other than the first element are all 1.

Optionally, each element in a first column vector in the first modulation matrix is 1.

Optionally, the first modulation matrix B is:

$$B=\begin{bmatrix}B_1\\B_2\\\vdots\\B_M\end{bmatrix}=\begin{bmatrix}b_{1,1}&b_{1,2}&\cdots&b_{1,M+1}\\b_{2,1}&b_{2,2}&\cdots&b_{2,M+1}\\\vdots&\vdots&\ddots&\vdots\\b_{M,1}&b_{M,2}&\cdots&b_{M,M+1}\end{bmatrix}=\begin{bmatrix}1&-1&1&\dots&1\\1&1&-1&\dots&1\\\vdots&\vdots&\vdots&\ddots&\vdots\\1&1&1&\dots&-1\end{bmatrix},$$

where M is an integer greater than or equal to 1.

Optionally, in a case that a length of the second reference signal modulation sequence is greater than 3, the first modulation matrix further includes a second column vector, and each element in the second column vector is −1.

Optionally, the first modulation matrix B is:

$$B=\begin{bmatrix}B_1\\B_2\\\vdots\\B_M\end{bmatrix}=\begin{bmatrix}b_{1,1}&b_{1,2}&\cdots&b_{1,M+1}\\b_{2,1}&b_{2,2}&\cdots&b_{2,M+1}\\\vdots&\vdots&\ddots&\vdots\\b_{M,1}&b_{M,2}&\dots&b_{M,M+1}\end{bmatrix}=\begin{bmatrix}1&-1&1&\dots&1&-1\\1&1&-1&\dots&1&-1\\1&\vdots&\vdots&-1&\vdots&\vdots\\1&1&1&\dots&-1&-1\end{bmatrix},$$

where M is an integer greater than or equal to 3.

Optionally, the step in which the network-side device determines the third reference signal modulation sequence based on the second reference signal modulation sequence includes: the network-side device multiplies the second reference signal modulation sequence by an on-off vector sequence to obtain the third reference signal modulation sequence, where elements in the on-off vector sequence include at least one third element and at least one fourth element, the third element is 0, and the fourth element is 1.

Optionally, a quantity of elements in the on-off vector sequence A is L, and duration corresponding to the second reference signal modulation sequence and duration corresponding to the third reference signal modulation sequence are in an L times relationship.

Optionally, the on-off vector sequence A is: A=[0 1 . . . 0 1].

The positioning apparatus in this embodiment of this application may be a communication device, for example, a communication device with an operating system, such as a terminal or a network-side device. For example, the terminal may include but is not limited to the foregoing illustrated type of the terminal 11, and the network-side device may include but is not limited to the foregoing illustrated type of the network-side device 12. This is not specifically limited in this embodiment of this application.

The positioning apparatuses 700 to 900 provided in the embodiments of this application can implement each process implemented by the method embodiments in FIG. 2 to FIG. 6, with the same technical effect achieved. To avoid repetition, details are not described herein again.

Figure 10:
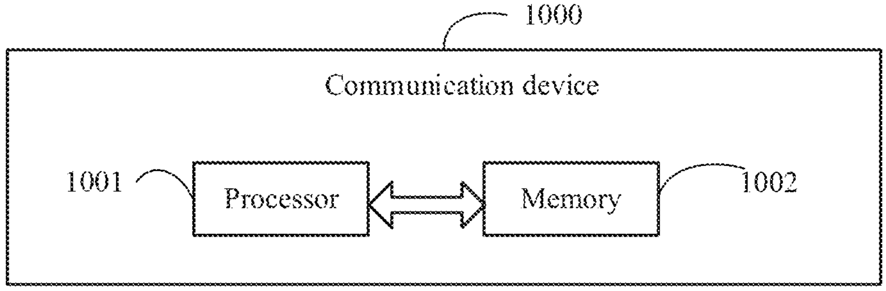
FIG. 10 is a schematic structural diagram of a communication device according to an embodiment of this application.

Optionally, as shown in FIG. 10, an embodiment of this application further provides a communication device 1000, including a processor 1001 and a memory 1002. The memory 1002 stores a program or instructions capable of running on the processor 1001. For example, when the communication device 1000 is a terminal, and the program or instructions are executed by the processor 1001, each step of the foregoing embodiment of the positioning method is implemented, with the same technical effect achieved. When the communication device 1000 is a network-side device, and the program or instructions are executed by the processor 1001, each step of the foregoing embodiment of the positioning method is implemented, with the same technical effect achieved. To avoid repetition, details are not described herein again.

Figure 11:
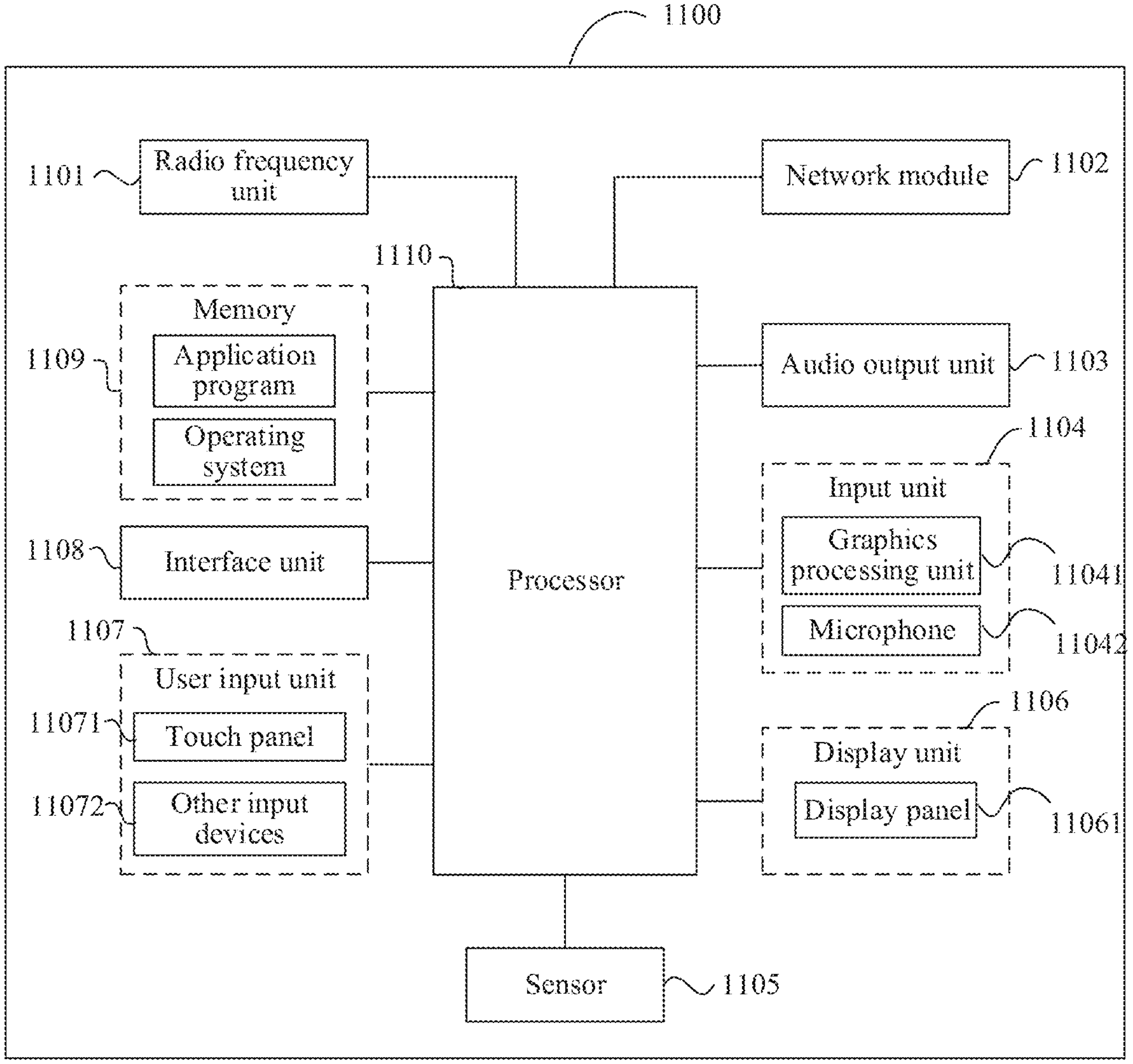
FIG. 11 is a schematic structural diagram of a terminal according to an embodiment of this application.

In an implementation, the communication device 1000 may be a terminal. The terminal may include a processor and a communication interface. The communication interface is coupled to the processor. The processor is configured to run the program or instructions to implement the steps of the methods in the method embodiments 200 to 500. The terminal embodiment corresponds to the foregoing method embodiments of the first communication device and the second communication device, and each implementation process and implementation of the foregoing method embodiments can be applied to the terminal embodiment, with the same technical effect achieved. Optionally, FIG. 11 is a schematic diagram of a hardware structure of a terminal for implementing an embodiment of this application.

The terminal 1100 includes but is not limited to at least some components such as a radio frequency unit 1101, a network module 1102, an audio output unit 1103, an input unit 1104, a sensor 1105, a display unit 1106, a user input unit 1107, an interface unit 1108, a memory 1109, and a processor 1110.

A person skilled in the art may understand that the terminal 1100 may further include a power supply (for example, a battery) supplying power to all components. The power supply may be logically connected to the processor 1110 through a power management system. In this way, functions such as charge management, discharge management, and power consumption management are implemented by using the power management system. The terminal structure shown in FIG. 11 does not constitute a limitation on the terminal. The terminal may include more or fewer components than those shown in the figure, or some components are combined, or component arrangements are different. Details are not described herein again.

It should be understood that, in this embodiment of this application, the input unit 1104 may include a graphics processing unit (GPU) 11041 and a microphone 11042. The graphics processing unit 11041 processes image data of a still picture or video obtained by an image capture apparatus (such as a camera) in a video capture mode or an image capture mode. The display unit 1106 may include a display panel 11061, and the display panel 11061 may be configured in a form of a liquid crystal display, an organic light-emitting diode, or the like. The user input unit 1107 includes at least one of a touch panel 11071 or other input devices 11072. The touch panel 11071 is also referred to as a touchscreen. The touch panel 11071 may include two parts: a touch detection apparatus and a touch controller. The other input devices 11072 may include but are not limited to a physical keyboard, a function button (such as a volume control button or a power button), a trackball, a mouse, and a joystick. Details are not described herein again.

In this embodiment of this application, after receiving downlink data from a network-side device, the radio frequency unit 1101 may transmit the downlink data to the processor 1110 for processing. In addition, the radio frequency unit 1101 may send uplink data to the network-side device. Usually, the radio frequency unit 1101 includes but is not limited to an antenna, an amplifier, a transceiver, a coupler, a low noise amplifier, a duplexer, and the like.

The memory 1109 may be configured to store software programs or instructions and various data. The memory 1109 may primarily include a first storage area for storing programs or instructions and a second storage area for storing data. The first storage area may store an operating system, an application program or instructions required by at least one function (such as an audio play function and an image play function), and the like. In addition, the memory 1109 may include a volatile memory or a non-volatile memory, or the memory 1109 may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). The memory 1109 in this embodiment of this application includes but is not limited to these and any other suitable types of memories.

The processor 1110 may include one or more processing units. Optionally, the processor 1110 integrates an application processor and a modem processor. The application processor mainly processes operations related to the operating system, a user interface, an application program, and the like. The modem processor mainly processes a wireless communication signal. For example, the modem processor is a baseband processor. It may be understood that the modem processor may alternatively be not integrated in the processor 1110.

The radio frequency unit 1101 is configured to receive a first signal sent by a first communication device; the processor 1110 is configured to modulate the first signal based on a second reference signal modulation sequence or a third reference signal modulation sequence to obtain a second signal; and the radio frequency unit 1101 is further configured to send the second signal to a second communication device, where the second reference signal modulation sequence is an orthogonal sequence determined based on binary phase shift keying BPSK modulation information.

Alternatively, the radio frequency unit 1101 is configured to receive a target signal, where the target signal includes at least a first signal sent by a first communication device and/or a second signal sent by at least one backscatter end; and the processor 1110 is configured to position at least one of the first communication device, the second communication device, or a target backscatter end based on the first signal and/or at least one second signal, where the target backscatter end is any one of the at least one backscatter end, the second signal is obtained by modulating the first signal based on a second reference signal modulation sequence or a third reference signal modulation sequence, the second reference signal modulation sequence is an orthogonal sequence determined based on binary phase shift keying BPSK modulation information, and the third reference signal modulation sequence is determined based on the second reference signal modulation sequence.

In this embodiment, based on orthogonal characteristics of the second reference signal modulation sequence or the third reference signal modulation sequence, a signal phase or reflection status of the backscatter end in different time units (such as slots) is controlled, so that the second communication device can perform an operation on the received target signal based on characteristics of the second reference signal modulation sequence or the third reference signal modulation sequence, to cancel an interference signal that affects the positioning process, thereby implementing positioning of the first communication device, the second communication device, or the target backscatter end, and improving positioning accuracy.

In another implementation, the communication device 1000 may alternatively be a network-side device. The network-side device may include a processor and a communication interface. The communication interface is coupled to the processor. The processor is configured to run the program or instructions to implement the steps of the methods in the embodiments 200 to 600. The network-side device embodiment corresponds to the foregoing method embodiment of the first communication device or the second communication device or the network-side device, and each implementation process and implementation of the foregoing method embodiment can be applied to the network-side device embodiment, with the same technical effect achieved.

Figure 12:
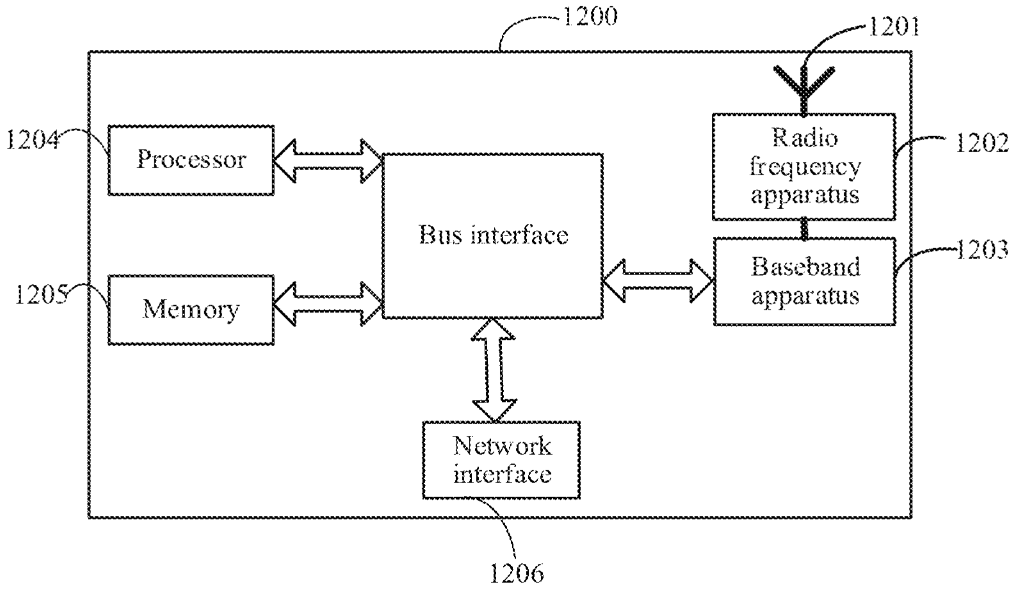
FIG. 12 is a schematic structural diagram of a network-side device according to an embodiment of this application.

Optionally, an embodiment of this application further provides a network-side device. As shown in FIG. 12, the network-side device 1200 includes an antenna 1201, a radio frequency apparatus 1202, a baseband apparatus 1203, a processor 1204, and a memory 1205. The antenna 1201 is connected to the radio frequency apparatus 1202. In an uplink direction, the radio frequency apparatus 1202 receives information by using the antenna 1201, and sends the received information to the baseband apparatus 1203 for processing. In a downlink direction, the baseband apparatus 1203 processes to-be-sent information, and sends the information to the radio frequency apparatus 1202; and the radio frequency apparatus 1202 processes the received information and then sends the information out by using the antenna 1201.

The method performed by the network-side device in the foregoing embodiment may be implemented in the baseband apparatus 1203. The baseband apparatus 1203 includes a baseband processor.

The baseband apparatus 1203 may include, for example, at least one baseband unit, where a plurality of chips are disposed on the baseband unit. As shown in FIG. 12, one of the chips is, for example, the baseband processor, connected to the memory 1205 by using a bus interface, to invoke a program in the memory 1205 to perform the operation of the network-side device shown in the foregoing method embodiment.

The network-side device may further include a network interface 1206, where the interface is, for example, a common public radio interface (CPRI).

Optionally, the network-side device 1200 in this embodiment of the present application further includes a program or instructions stored in the memory 1205 and capable of running on the processor 1204. When the processor 1204 invokes the program or instructions in the memory 1205, the method performed by each module shown in FIG. 6 is performed, with the same technical effect achieved. To avoid repetition, details are not described herein again.

An embodiment of this application further provides a non-transitory readable storage medium. The non-transitory readable storage medium stores a program or instructions. When the program or instructions are executed by a processor, each process of the foregoing positioning method embodiment is implemented, with the same technical effect achieved. To avoid repetition, details are not described herein again.

The processor is a processor in the terminal in the foregoing embodiment. The non-transitory readable storage medium includes a non-transitory computer-readable storage medium, such as a computer read-only memory ROM, a random access memory RAM, a magnetic disk, or an optical disc.

In addition, an embodiment of this application provides a chip. The chip includes a processor and a communication interface. The communication interface is coupled to the processor. The processor is configured to run a program or instructions on a network-side device to implement each process of the foregoing positioning method embodiment, with the same technical effect achieved. To avoid repetition, details are not described herein again.

It should be understood that the chip provided in this embodiment of this application may also be referred to as a system-level chip, a system chip, a chip system, a system-on-chip, or the like.

An embodiment of this application further provides a computer program product. The computer program product includes a processor, a memory, and a program or instructions stored in the memory and capable of running on the processor. When the program or instructions are executed by the processor, each process of the foregoing positioning method embodiment is implemented, with the same technical effect achieved. To avoid repetition, details are not described herein again.

An embodiment of this application further provides a positioning system, including a first communication device and a second communication device. The first communication device may be configured to perform the steps of the foregoing method embodiments 200 and 300. The second communication device may be configured to perform the steps of the foregoing method embodiment 500.

In addition, when the second communication device or the first communication device is a network-side device, the second communication device or the first communication device may be further configured to perform the steps of the foregoing method embodiment 600. Alternatively, if neither the first communication device nor the second communication device is a network-side device, the positioning system may further include a network-side device configured to perform the steps of the foregoing method embodiment 600.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples. In other words, features in the foregoing embodiments and implementations may be combined.

According to the foregoing description of the implementations, a person skilled in the art may clearly understand that the methods in the foregoing embodiments may be implemented by using software in combination with a necessary general hardware platform, and certainly may alternatively be implemented by using hardware. However, in most cases, the former is a preferred implementation. Based on such an understanding, the technical solutions of this application essentially or the part contributing to the prior art may be implemented in a form of a computer software product. The computer software product is stored in a non-transitory storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing embodiments. The foregoing embodiments are merely illustrative rather than restrictive. Inspired by this application, a person of ordinary skill in the art may develop many other manners without departing from principles of this application and the protection scope of the claims, and all such manners fall within the protection scope of this application.

What is claimed is:

1. A positioning method, comprising:

receiving, by a backscatter end, a first signal sent by a first communication device;

modulating, by the backscatter end, the first signal based on a second reference signal modulation sequence or a third reference signal modulation sequence to obtain a second signal; and sending, by the backscatter end, the second signal to a second communication device, wherein the second reference signal modulation sequence is an orthogonal sequence determined based on binary phase shift keying (BPSK) modulation information, and the third reference signal modulation sequence is determined based on the second reference signal modulation sequence.

2. The method according to claim 1, wherein the second reference signal modulation sequence comprises M+x modulation symbols, x is 1 or 2, M is related to a quantity of backscatter ends participating in a positioning process, and M is an integer greater than or equal to 1; and modulation duration corresponding to a first reference signal modulation sequence and modulation duration corresponding to the second reference signal modulation sequence are in an M+x times relationship, and the first signal is obtained based on the first reference signal modulation sequence.

3. The method according to claim 2, wherein at least one of the first reference signal modulation sequence or the second reference signal modulation sequence comprises a positioning reference signal modulation sequence.

4. The method according to claim 1, wherein before the step of modulating, by the backscatter end, the first signal based on a second reference signal modulation sequence or a third reference signal modulation sequence to obtain a second signal, the method further comprises any one of the following:

obtaining, by the backscatter end, the second reference signal modulation sequence from a network-side device, wherein the second reference signal modulation sequence is selected by the network-side device, based on identification information of the backscatter end, from a plurality of row vectors comprised in a first modulation matrix;

obtaining, by the backscatter end, the third reference signal modulation sequence from the network-side device, wherein the third reference signal modulation sequence is selected by the network-side device, based on the identification information of the backscatter end, from a plurality of row vectors comprised in a second modulation matrix;

obtaining, by the backscatter end, the first modulation matrix from the network-side device, and selecting, based on the identification information of the backscatter end, the second reference signal modulation sequence from the plurality of row vectors comprised in the first modulation matrix;

obtaining, by the backscatter end, the second modulation matrix from the network-side device, and selecting, based on the identification information of the backscatter end, the third reference signal modulation sequence from the plurality of row vectors comprised in the second modulation matrix; and obtaining, by the backscatter end, the second reference signal modulation sequence from the network-side device, and determining the third reference signal modulation sequence based on the second reference signal modulation sequence.

5. The method according to claim 4, wherein a first element in each row vector in the first modulation matrix is −1, second elements other than the first element are all 1, and a position of the first element in each row vector is different.

6. The method according to claim 5, wherein each element in a first column vector in the first modulation matrix is 1; and the first modulation matrix B is:

$$B=\begin{bmatrix}B_1\\B_2\\\vdots\\B_M\end{bmatrix}=\begin{bmatrix}b_{1,1}&b_{1,2}&\cdots&b_{1,M+1}\\b_{2,1}&b_{2,2}&\cdots&b_{2,M+1}\\\vdots&\vdots&\ddots&\vdots\\b_{M,1}&b_{M,2}&\ldots&b_{M,M+1}\end{bmatrix}=\begin{bmatrix}1&-1&1&\ldots&-1\\1&1&-1&\ldots&-1\\\vdots&\vdots&\vdots&\ddots&\vdots\\1&1&1&\ldots&-1\end{bmatrix}.$$

7. The method according to claim 5, wherein in a case that a length of the second reference signal modulation sequence is greater than 3, the first modulation matrix further comprises a second column vector, and each element in the second column vector is −1; and the first modulation matrix B is:

$$B=\begin{bmatrix}B_1\\B_2\\\vdots\\B_M\end{bmatrix}=\begin{bmatrix}b_{1,1}&b_{1,2}&\cdots&b_{1,M+1}\\b_{2,1}&b_{2,2}&\cdots&b_{2,M+1}\\\vdots&\vdots&\ddots&\vdots\\b_{M,1}&b_{M,2}&\ldots&b_{M,M+1}\end{bmatrix}=\begin{bmatrix}1&-1&1&\ldots&1&-1\\1&1&-1&\ldots&1&-1\\1&\vdots&\vdots&-1&\vdots&\vdots\\1&1&1&\ldots&-1&-1\end{bmatrix}.$$

8. The method according to claim 1, wherein the step of determining the third reference signal modulation sequence based on the second reference signal modulation sequence comprises:

multiplying, by the backscatter end, the second reference signal modulation sequence by an on-off vector sequence to obtain the third reference signal modulation sequence, wherein elements in the on-off vector sequence comprise at least one third element and at least one fourth element, the third element is 0, and the fourth element is 1.

9. The method according to claim 8, wherein a quantity of elements in the on-off vector sequence is L, and a modulation duration corresponding to the second reference signal modulation sequence and modulation duration corresponding to the on-off vector sequence are in an L times relationship; and the on-off vector sequence A is:

$$A=[0\ \ 1\ \ \cdots\ \ 0\ \ 1].$$

10. The method according to claim 1, wherein in a case that a positioning scenario is a UU uplink positioning scenario, the first communication device is a terminal, and the second communication device is the network-side device;

in a case that a positioning scenario is a UU downlink positioning scenario, the first communication device is the network-side device, and the second communication device is a terminal; or in a case that a positioning scenario is a sidelink positioning scenario, both the first communication device and the second communication device are terminals.

11. A positioning method, wherein the method comprises:

receiving, by a second communication device, a target signal, wherein the target signal comprises at least a first signal sent by a first communication device and/or a second signal sent by at least one backscatter end; and positioning, by the second communication device, at least one of the first communication device, the second communication device, or a target backscatter end based on the first signal and/or at least one second signal, wherein the target backscatter end is any one of the at least one backscatter end, the second signal is obtained by modulating the first signal based on a second reference signal modulation sequence or a third reference signal modulation sequence, the second reference signal modulation sequence is an orthogonal sequence determined based on binary phase shift keying (BPSK) modulation information, and the third reference signal modulation sequence is determined based on the second reference signal modulation sequence.

12. The method according to claim 11, wherein the step of positioning, by the second communication device, the first communication device based on the first signal and/or at least one second signal comprises either of the following:

in a case that a length of the second reference signal modulation sequence is 2 or 3, positioning, by the second communication device, the first communication device based on a sum of a first target signal and a second target signal, wherein the first target signal is a signal received by the second communication device in a first time unit, the second target signal is a signal received by the second communication device in a second time unit, and a phase of a modulation symbol in the second reference signal modulation sequence corresponding to the first time unit is opposite to a phase of a modulation symbol in the second reference signal modulation sequence corresponding to the second time unit; and in a case that the length of the second reference signal modulation sequence is greater than 3, positioning, by the second communication device, the first communication device based on a sum of a third target signal and a fourth target signal, wherein the third target signal is a signal received by the second communication device in an $(M+2)^{th}$ time unit, and the fourth target signal is a signal obtained by the second communication device by performing weighted processing on a signal received from the first time unit to an $(M+1)^{th}$ time unit.

13. The method according to claim 12, wherein in a case that the length of the second reference signal modulation sequence is 2, the sum of the first target signal and the second target signal is $$y'[n]=y_m[n]+y_{m+1}[n]=2h_{sr}s[n]+w_m[n]+w_{m+1}[n];$$

in a case that the length of the second reference signal modulation sequence is 3, the sum of the first target signal and the second target signal is $$y'[n]=y_{m+1}[n]+y_{m+2}[n]=2h_{sr}s[n]+w_{m+1}[n]+w_{m+2}[n];$$

or in the case that the length of the second reference signal modulation sequence is greater than 3, the sum of the third target signal and the fourth target signal is $$y'[n]=y_{M+2}[n]+\frac{1}{M-1}\sum_{m1}^{M+1}y_m[n].$$

14. The method according to claim 11, wherein the step of positioning, by the second communication device, the target backscatter end based on the first signal and/or at least one second signal comprises:

if the target backscatter end is an $m^{th}$ backscatter end of the at least one backscatter end, in a case that the length of the second reference signal modulation sequence is 2, positioning, by the second communication device, the $m^{th}$ backscatter end based on a difference between a fifth target signal and a sixth target signal, wherein the fifth target signal is a signal received by the second communication device in a third time unit, the sixth target signal is a signal received by the second communication device in a fourth time unit, a modulation symbol corresponding to the third time unit is 1, and a modulation symbol corresponding to the fourth time unit is −1.

15. The method according to claim 14, wherein the difference $y'_m[n]$ between the fifth target signal and the sixth target signal is:

$$\begin{aligned} y'_m[n] &= y_1[n] - y_{m+1}[n] \\ &= \alpha\sum_{k=1}^{M}(h_{st,m}h_{tr,m}b_{1,m} - h_{st,m}h_{tr,m}b_{k+1,m})s[n] + w_1[n] - w_{k+1}[n] \\ &= 2\alpha h_{st,k}h_{tr,k}s[n] + w_1[n] - w_{k+1}[n] \end{aligned}$$

wherein $h_{tr,m}$ is a channel response, α is an attenuation coefficient of an unknown reflector comprising a rader cross section RCS, $h_{st,m}$ is a channel response between the first communication device and the $m^{th}$ backscatter end, $h_{tr,m}$ is a channel response between the second communication device and the $m^{th}$ backscatter end, $w_1[n]$ is additive white Gaussian noise (AWGN) noise received in a first time unit, $w_{k+1}[n]$ is AWGN noise received in a $(k+1)^{th}$ time unit, and s[n] is the first signal.

16. The method according to claim 11, wherein the step of positioning, by the second communication device, at least one of the first communication device, the second communication device, or a target backscatter end based on the first signal and/or at least one second signal comprises:

obtaining, by the second communication device, at least one of a first measurement parameter, a second measurement parameter, or a third measurement parameter based on the first signal and/or the at least one second signal; and sending, by the second communication device, the at least one of the first measurement parameter, the second measurement parameter, or the third measurement parameter to a sensing function, wherein the first measurement parameter is used for positioning the first communication device, the second measurement parameter is used for positioning the second communication device, and the third measurement parameter is used for positioning the at least one backscatter end.

17. A positioning method, comprising either of the following:

sending, by a network-side device, a second reference signal modulation sequence and/or a third reference signal modulation sequence to each backscatter end based on identification information of at least one backscatter end; and sending, by the network-side device, a first modulation matrix and/or a second modulation matrix to the at least one backscatter end, wherein the second reference signal modulation sequence is any one of a plurality of row vectors comprised in the first modulation matrix, and the second reference signal modulation sequence is an orthogonal sequence determined based on binary phase shift keying (BPSK) modulation information; and the third reference signal modulation sequence is any one of a plurality of row vectors comprised in the second modulation matrix, and the third reference signal modulation sequence is determined based on the second reference signal modulation sequence.

18. The method according to claim 17, wherein for the at least one backscatter end, at least part of the second reference signal modulation sequence corresponding to each backscatter end is different.

19. The method according to claim 17, further comprising:

multiplying, by the network-side device, the second reference signal modulation sequence by an on-off vector sequence to obtain the third reference signal modulation sequence, wherein elements in the on-off vector sequence comprise at least one third element and at least one fourth element, the third element is 0, and the fourth element is 1.

20. A communication device, comprising a processor and a memory, wherein the memory stores a program or instructions capable of running on the processor, and when the program or instructions are executed by the processor, the steps of the positioning method according to claim 1 are implemented.

* * * * *